United States Patent [19]
Yotsuya et al.

[11] Patent Number: 5,902,557
[45] Date of Patent: May 11, 1999

[54] DEVICE FOR PURIFYING EXHAUST GAS OF INTERNAL COMBUSTION ENGINE

[75] Inventors: Kouki Yotsuya, Tokyo; Takuzou Kako, Tokai; Shogo Konya, Kawasaki; Yuuji Nakashima, Futtsu; Kouji Yoshizaki, Numazu; Kazuhiro Sakurai, Gotenba; Masahiko Ogai, Toyota, all of Japan

[73] Assignees: Nippon Steel Corporation, Tokyo; Toyota Jidosha Kabushiki Kaisa, Toyota, both of Japan

[21] Appl. No.: 08/776,679

[22] PCT Filed: May 30, 1996

[86] PCT No.: PCT/JP96/01474

§ 371 Date: Apr. 15, 1997

§ 102(e) Date: Apr. 15, 1997

[87] PCT Pub. No.: WO96/38657

PCT Pub. Date: May 12, 1996

[30] Foreign Application Priority Data

| | | | |
|---|---|---|---|
| May 30, 1995 | [JP] | Japan | 7-131598 |
| Mar. 13, 1996 | [JP] | Japan | 8-055963 |
| Mar. 14, 1996 | [JP] | Japan | 8-057521 |

[51] Int. Cl.$^6$ ........................................................ F01N 3/10
[52] U.S. Cl. .......................... 422/174; 422/171; 422/179; 422/180; 422/199; 422/211; 422/221; 422/222; 60/300
[58] Field of Search .................................. 422/171, 173, 422/174, 179, 199, 211, 222, 180, 221; 60/299, 300; 428/116, 593, 594

[56] References Cited

U.S. PATENT DOCUMENTS

| | | | |
|---|---|---|---|
| 5,140,812 | 8/1992 | Cornelison et al. | 422/174 |
| 5,232,671 | 8/1993 | Brunson et al. | 422/174 |
| 5,240,682 | 8/1993 | Cornelison et al. | 422/174 |
| 5,317,869 | 6/1994 | Takeuchi | 422/174 |
| 5,323,608 | 6/1994 | Honma | 422/180 |

FOREIGN PATENT DOCUMENTS

| | | |
|---|---|---|
| 54-56019 | 4/1979 | Japan . |
| 55-110714 | 8/1980 | Japan . |
| 64-27421 | 2/1989 | Japan . |
| 5-269389 | 10/1993 | Japan . |
| 6-2534 | 1/1994 | Japan . |
| 6-31833 | 4/1994 | Japan . |
| 6-226112 | 8/1994 | Japan . |
| 6-80814 | 11/1994 | Japan . |
| 07054644 | 2/1995 | Japan . |
| 7-54644 | 2/1995 | Japan . |
| 7224645 | 8/1995 | Japan . |
| 1452982 | 10/1976 | United Kingdom . |

*Primary Examiner*—Hien Tran
*Attorney, Agent, or Firm*—Kenyon & Kenyon

[57] ABSTRACT

In an electrically heated catalyst support, when necessary, reinforcing layers are formed on the inner circumference and the outer circumference of a honeycomb body. On an end surface of the honeycomb body on the downstream side of exhaust gas, there are provided a plurality of insulating ceramic bars on the outer circumferential layer and/or the inner circumferential layer in such a manner that the insulating ceramic bars cross a non-reinforcing layer of the honeycomb body. End portions of the ceramic bars are held on the reinforcing layer by pins or a ring-shaped holding member joined to an external metallic cylinder. Due to the foregoing arrangement, telescoping of the honeycomb body in the direction of gas flow and damage of the metallic foil can be prevented without obstructing the generation of heat when electricity is supplied. Accordingly, durability of the catalyst support can be remarkably enhanced.

29 Claims, 31 Drawing Sheets

DEVICE FOR PURIFYING EXHAUST GAS OF INTERNAL COMBUSTION ENGINE

TECHNICAL FIELD

The present invention relates to a device for purifying the exhaust gas of an internal combustion engine. More particularly, the present invention relates to an electrically heated catalyst device, the catalyst support of which is composed of a metallic honeycomb body, and the temperature of the catalyst support can be raised to a catalyst activating temperature in a short period of time when heat is generated by supplying electricity.

BACKGROUND ART

Exhaust gas discharged from an internal combustion engine incorporated into a vehicle contains harmful chemical substances such as HC (hydrocarbon), CO (carbon monoxide) and $NO_x$ (nitrogen oxides). Therefore, conventionally, a catalyst converter used as an exhaust gas purifying device is arranged in an exhaust gas passage of the internal combustion engine. However, it is known that a rate of purification of a three-way catalyst used for the catalyst converter to purify the harmful substances contained in exhaust gas is low when the catalyst temperature is low, that is, when the catalyst is in an inactive condition. Accordingly, the conventional catalyst converter is disadvantageous in that exhaust gas can not be sufficiently purified when the catalyst is in an inactive condition immediately after the internal combustion engine has been started.

In order to solve the above problems, there is proposed an exhaust gas purifying device having an electrically heated catalyst device in which the catalyst support is made of metal and this metallic catalyst support is heated to a catalyst activity temperature (300 to 400° C.) in a short period of time by supplying electricity when the internal combustion engine is started or the catalyst is in an inactive condition due to a low temperature.

As shown in FIG. 29, the exhaust gas purifying device is composed as follows. There is provided an external metallic cylinder 1 connected to the exhaust gas passage of an internal combustion engine. In the external metallic cylinder 1, there are provided an electrically heated catalyst support 2, which is heated by supplying electricity, and a main catalyst support 3, wherein the electrically heated catalyst support 2 and the main catalyst support 3 are arranged in series at a predetermined interval. In the electrically heated catalyst support 2, there is provided a central electrode 6, and an electrode section 8A of this central electrode 6 is led to the outside of the external metallic cylinder 1. Between this electrode section 8A and an external electrode 8B attached to a portion of the external metallic cylinder 1, there is arranged a battery 9 and a switch SW. When this switch SW is turned on, an electric current is fed to the electrically heated catalyst support 2 to be heated, so that heat is generated in the catalyst support 2.

As shown in FIG. 30(a), the electrically heated catalyst support 2 is composed as follows. A sheet of metallic foil 4 formed into a corrugated form, which will be referred to as a corrugated foil 4 hereinafter in this specification, and a flat sheet of metallic foil 5, which will be referred to as a flat foil 5 hereinafter in this specification, are put on each other, and the respective longitudinal end portions of the corrugated foil 4 and the flat foil 5 are joined and wound around the central electrode 6 while they are put on each other, so that a spirally-shaped metallic foil laminated body, which is referred to as a honeycomb body, can be formed. In general, these corrugated foil 4 and flat foil 5 are made of alloy of iron containing aluminum, for example, the composition is 20% Cr-5% Al-75% Fe, and the thickness of the foil is approximately 50 μm.

FIG. 30(b) is a view showing one end face of the honeycomb body 7 composed of the metallic corrugated foil 4 and the flat foil 5. In honeycomb body 7, the corrugated foil 4 and the flat foil 5 are put on each other and wound round the central electrode 6. As a result, around the central electrode 6, there are formed a large number of spiral passages P in the axial direction formed by clearances between the corrugated foil 4 and the flat foil 5 of the honeycomb body 7. On the surfaces of the corrugated foil 4 and the flat foil 5, exhaust gas purifying catalysts are supported. Due to the above structure, when exhaust gas flows in the above passages P under the condition that the switch SW shown in FIG. 29 is turned on and the honeycomb body 7 is fed with an electric current so that the catalyst temperature is raised to a temperature of catalyst activity, the harmful components contained in exhaust gas come into contact with the catalyst, so that the exhaust gas can be purified.

In the exhaust gas purifying device composed in the above manner, by the influence of exhaust gas of high temperature flowing at high speed in the exhaust gas passage, and also by the influence of a heat cycle produced by the internal combustion engine which starts and stops, and also by the influence of vibration transmitted from the engine and the vehicle body to the catalyst, slippage is caused between the corrugated foil 4 and the flat foil 5 of the honeycomb body 7. This slippage will be referred to as "telescoping" in this specification, hereinafter. Further, the corrugated foil 4 and the flat foil 5 of the honeycomb body 7 are damaged. In this way, there is a possibility that the function of the electrically heated catalyst support is deteriorated.

In order to prevent the occurrence of telescoping between the corrugated foil 4 and the flat foil 5, and also to prevent the occurrence of damage of the corrugated foil 4 and the flat foil 5, for example, as shown in FIG. 32, British Patent Publication No. 1452982 discloses the following honeycomb body holding structure. An end face of the honeycomb body 7 on the downstream side of exhaust gas is supported by a cross-shaped metallic bar 70 which crosses an end face of the honeycomb body 7 in a contact condition, and an end portion of this metallic bar is fixed onto the external cylinder 1.

However, when the above honeycomb body holding structure is applied to an electrically heated metallic catalyst converter, the following problems may be encountered. When the honeycomb body 7 is energized with an electric current, the electric current bypasses the catalyst support and flows to the metallic bar 70, so that the heat generating efficiency of the honeycomb body 7 in the electric passage is greatly lowered and the function of the electrically heated catalyst support is deteriorated. Further, when a difference of temperature between the metallic bar 70 and the external metallic cylinder 1 is large, that is, when a difference of the thermal expansion coefficient between the metallic bar 70 and the external metallic cylinder 1 is large, the catalyst converter tends to be damaged.

On the other hand, Japanese Unexamined Patent Publication No. 5-269389 discloses an electrically heated catalyst device in which an end face of the honeycomb body on the downstream side is supported by one support bar covered with an electrically insulating strip, and this support bar is welded to an outside metallic housing (external cylinder).

However, this converter device is disadvantageous in that a welding portion between the support bar and the outside housing tends to be damaged by a difference of temperature and also by a difference of the thermal expansion coefficient. Further, there is a possibility of occurrence of telescoping of the honeycomb body in a portion not supported by the support bar.

In the above catalyst device, the following problems may be also encountered. In an exhaust gas purifying device in which a main metallic catalyst support is arranged on the downstream side of exhaust gas of the electrically heated catalyst, in order to enhance the warm-up property of the main catalyst support, the electrically heated catalyst support and the main catalyst support are located as closely as possible to each other so that heat can be effectively transmitted from the electrically heated catalyst support to the main catalyst support. In the above case, there is a possibility that the fixing pin to fix the support bar comes into contact with the main catalyst support, and the electrically heated catalyst is short-circuited, so that the heating performance of the electrically heated catalyst support is affected.

As described above, any conventional honeycomb body holding structure has a shortcoming. Therefore, the conventional honeycomb body holding structure is not appropriate for holding a honeycomb body of an electrically heated metallic catalyst carrier.

It is an object of the present invention to provide an electrically heated metallic catalyst in which the aforementioned problems of the conventional honeycomb body holding structure are not caused.

In other words, an object of the present invention is to provide an electrically heated catalyst device characterized in that: the occurrence of telescoping of the electrically heated catalyst support is prevented; the weight of the holding structure of the electrically heated catalyst support is not extremely increased; and there is no possibility of damage of the supporting bar and the supporting bar holding member, which tends to be caused by a difference of the thermal expansion coefficient in the operation of an engine after the electrically heated catalyst device has been incorporated into a vehicle, whereby the durability can be enhanced.

It is another object of the present invention to provide an exhaust gas purifying device in which the warm-up property can be enhanced by arranging the electrically heated catalyst support as closely as possible to the main catalyst support made of metal, without causing a short-circuit.

SUMMARY OF THE INVENTION

In order to accomplish the above objects, the present invention is to provide an electrically heated catalyst device used for an exhaust gas purifying device of an internal combustion engine, into which an electrically heated catalyst support and a main catalyst support are incorporated, the electrically heated catalyst device comprising: a plurality of electrically insulating ceramic bars arranged on an end face of an electrically heated catalyst support on the downstream side of exhaust gas flowing in the electrically heated catalyst support, wherein both end portions of the ceramic bars are held at the outer circumferential portions of the electrically heated catalyst support.

According to the present invention, electrically insulating ceramic bars, the principal component of which is, for example, nitrogen silicon or alumina, are arranged crossing an end face of a catalyst support on the downstream side of exhaust gas so that a substantially central portion between a center of the honeycomb body and an outer metallic cylinder on the end face of the catalyst support on the downstream side of exhaust gas can be supported by the ceramic bars. A plurality of ceramic bars are symmetrically arranged round the center of the honeycomb body.

Due to the above structure, the occurrence of telescoping of the catalyst support can be effectively prevented.

Both end portions of the ceramic bars are held by pins fixed to the catalyst support or holding portions of a ring-shaped holding member fixed to the external metallic cylinder at positions close to the outer circumferential portion of the electrically heated catalyst support. Due to the foregoing, even when the honeycomb body is deformed by the influence of thermal expansion or cooling contraction, only the holding portion is deformed and moved. Therefore, stress is not given to the ceramic bars, so that damage is not caused between the honeycomb body and the ceramic bars. Accordingly, it is possible to enhance the durability of the electrically heated catalyst support.

When an elastic member is arranged between the ceramic bar and the holding portion of a ring-shaped holding member, the elastic member absorbs a difference of thermal expansion between them. Therefore, damage of the ceramic bar can be effectively prevented by the elastic member.

Further, at both end portions of the ceramic bar on the face in the downstream of exhaust gas, there is provided a recess or a through-hole, and a pin is inserted into this recess or the through-hole, and a head portion of the pin is set to be lower than the surface of the ceramic bar, and further an end portion of the pin is fixed to the electrically heated catalyst support. Due to the foregoing structure, an end face of the catalyst support in the downstream of exhaust gas can be held by the ceramic bars, and the main catalyst support can be arranged at a position where an end face of the main catalyst support in the upstream of exhaust gas is contacted with an end face of the ceramic bar in the downstream of exhaust gas. Due to the above structure, it is possible to quickly raise the temperature of the main catalyst support without damaging the head portion of the pin.

When the main catalyst support is arranged adjacent to the electrically heated catalyst support in an electrically insulating condition and the pins to hold the ceramic bars are inserted into and fixed to the main catalyst support, in addition to the aforementioned effect, it is possible to provide the effect that the intensity of a load given to the pins can be reduced and the size of the pins can be further reduced. Furthermore, the heat capacity of the pin itself can be reduced, so that the speed of the increase in temperature of the main catalyst support can be further increased. Furthermore, since the size of the pin is reduced, the weight of a vehicle is reduced, and it is possible to lower the manufacturing cost.

MOST PREFERRED EMBODIMENT

Figure 1A:
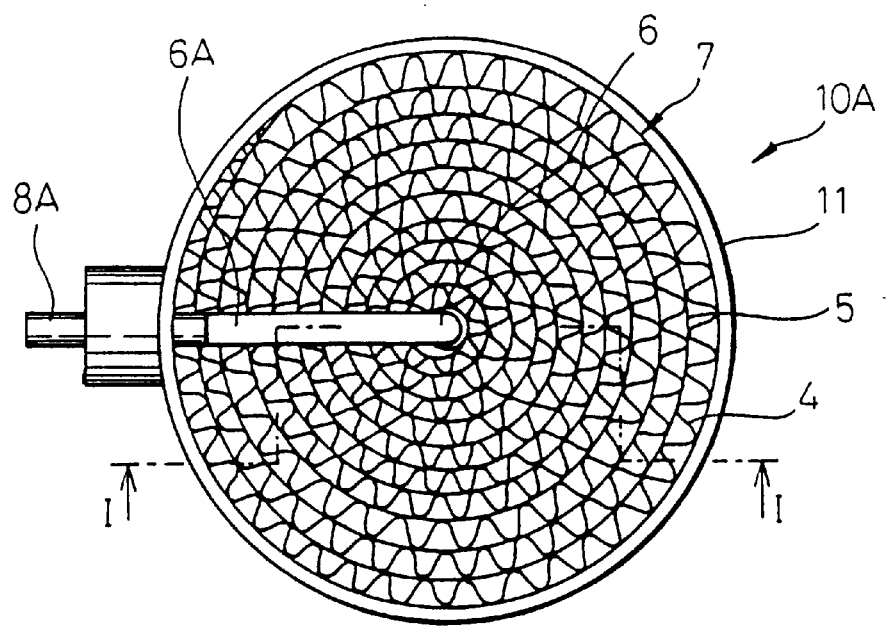
FIG. 1(a) is a plan view of the electrically heated catalyst device of an example of the present invention.

Referring to the accompanying drawings, the most preferred embodiment of the present invention will be explained as follows. In the following explanations of the exhaust gas purifying device, like reference characters are used to indicate like parts in FIGS. 29 to 32.

Figure 1B:
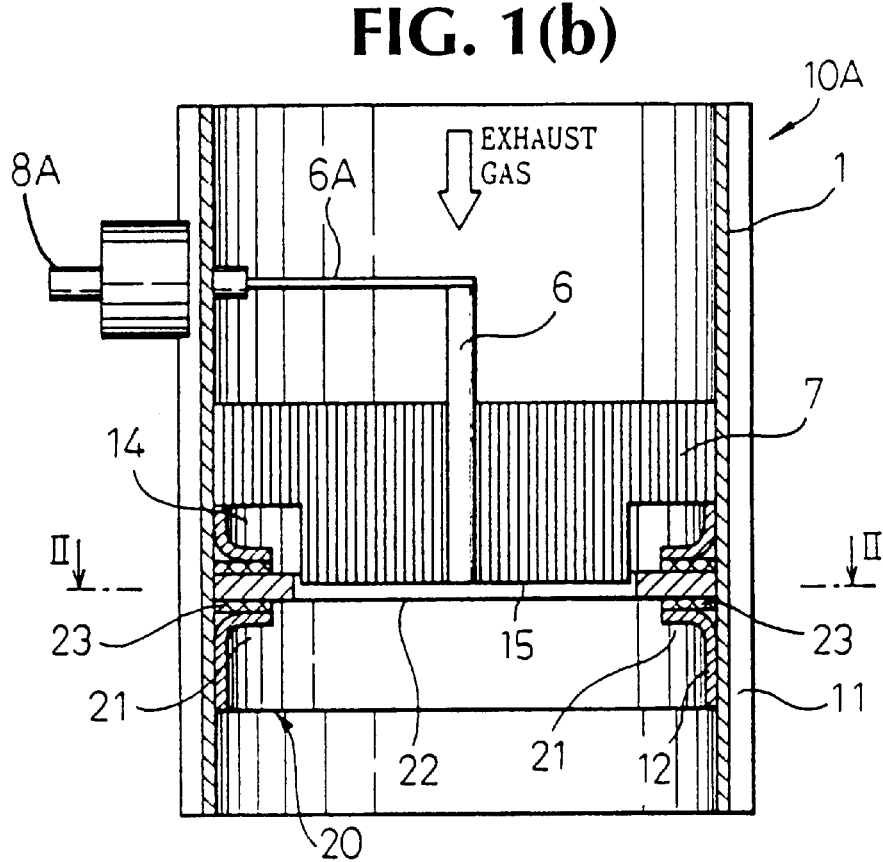
FIG. 1(b) is a cross-sectional view taken on line I—I in FIG. 1(a).
Figure 2:
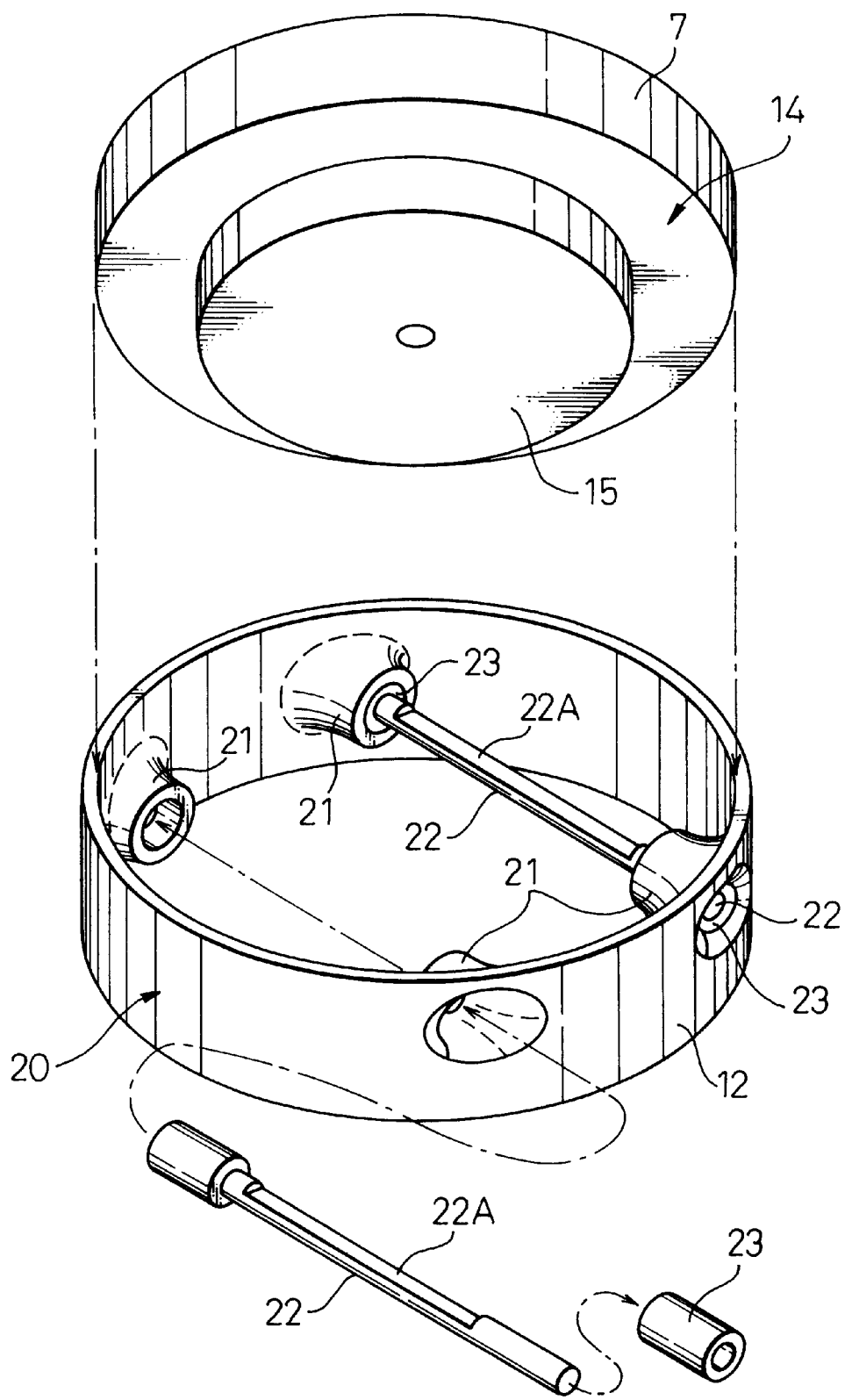
FIG. 2 is an assembling perspective view for explaining a state in which a honeycomb body is mounted on a holding member and ceramic bars of the example shown in FIG. 1.
Figure 3A:
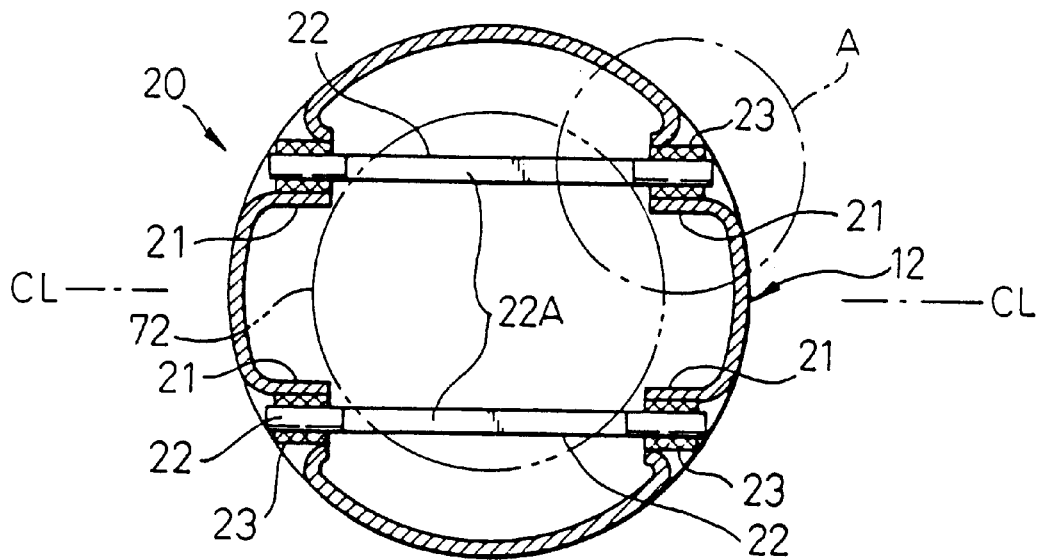
FIG. 3(a) is a cross-sectional view taken on line II—II in FIG. 1(b).
Figure 3B:
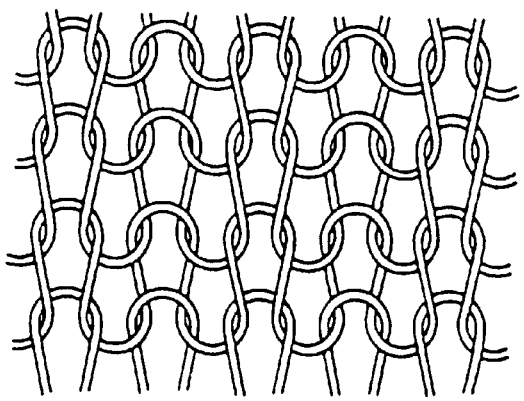
FIG. 3(b) is a partially enlarged view showing the structure of an elastic member shown in FIG. 3(a).

FIG. 1(a) is a plan view of the electrically heated catalyst device 10 of an example of the present invention in which a ring-shaped holding member is used. FIG. 1(b) is a vertical cross-sectional view taken on line I—I in FIG. 1(a). FIG. 2 is an assembling perspective view for explaining the holding structure of the electrically heated catalyst support shown in FIG. 1. FIG. 3(a) is a horizontal cross-sectional view taken on line II—II in FIG. 1(b).

As shown in FIGS. 1(a) and 1(b), the honeycomb 7 composed of the corrugated foil 4 and flat foil 5 explained in FIG. 30 is inserted into the external metallic cylinder 1 of the electrically heated catalyst device 10A. At the center of the honeycomb body 7, there is arranged a central electrode 6. This central electrode 6 is connected to the electrode section 8A, which is arranged on an outer circumferential surface of the external metallic cylinder 1, via the lead section 6A. In this example, a peripheral portion on the lower end face of the honeycomb body 7 is cut away as shown in FIG. 1(b). Therefore, a ring-shaped cut-away portion 14 is formed in the honeycomb body 7. This cut-away portion 14 is used as an attaching space in which a ring-shaped holding member 20 described later is attached.

On the other hand, the external metallic cylinder 1 is extended to a position more distant from the attaching portion of the honeycomb body 7 in the downstream direction of the flow of exhaust gas. In this extending section 11, there are provided a ceramic bar 22, which is used as an insulating retainer of the honeycomb body 7, and a ring-shaped holding member 20 for holding the ceramic bar. As shown in FIG. 2, the ring-shaped holding member 20 is composed of a metallic cylinder 12 made of a thin metallic sheet. An outside diameter of the metallic cylinder 12 is determined to be a value at which the metallic cylinder 12 comes into contact with the inside of the external metallic cylinder 1. On the upper end side of this metallic cylinder 12, there are formed four holding sections 21.

In this example, the holding sections 21 are formed by means of preventing processing on the outer circumferential surface of the metallic cylinder 12. Each holding section 21 is formed into a cylindrical shape protruding inside from the metallic cylinder 12. Two of the four holding sections 21 are opposed to each other, interposing an inner space of the metallic cylinder 12 in such a manner that the two holding sections 21 are continuously located on the same axis. These two sets of holding sections 21, which are opposed to each other, are located symmetrically to each other with respect to the center line CL which passes through the center of the metallic cylinder 12 as shown in FIG. 3(a).

Between the holding sections 21 of the metallic cylinder 12 which are opposed to each other as described above, there are arranged ceramic bars 22 via the elastic members 23. The shape of this ceramic bar 22 is columnar as shown in FIG. 2, and a plane 22A of a predetermined length is formed at the center of the ceramic bar 22. This plane 22A is formed for the purpose of setting a bottom surface 15 of the honeycomb body 7. The two-dotted chain line shown in FIG. 3(a) indicates a position at which the bottom surface 15 of the honeycomb body 7 is set. The length of the plane 22A is determined to be an appropriate value to set the bottom surface 15 of the honeycomb body 7 on the plane 22A stably. The ceramic bar 22 is arranged at a position where a substantially central portion of the honeycomb body 7 between the central electrode and the external metallic cylinder is supported by the ceramic bar 22.

The elastic member 23 is composed in such a manner that, for example, thin heat-resistant metallic wires, the diameter of which is 0.1 to 0.5 mm, are knitted, and the thus knitted metallic wires are gathered and formed into a predetermined shape of a predetermined density by means of press forming using a press die. In this example, the elastic member 23 is formed into a cylindrical shape as shown in FIG. 2. In the process of forming, when the elastic member 23 is not given a force from the outside, the maximum diameter (the outer diameter) of the elastic member 23 is determined to be a value higher than the inner diameter of the holding section 21. The minimum diameter (the inner diameter) of the elastic member 23 is determined to be a value lower than the outer diameter of the ceramic bar 22. When a force is given to the elastic member 23 from the outside, the maximum and the minimum diameter of the elastic member 23 are changed. These elastic members 23 are fitted to both ends of the ceramic bar 22 while the minimum diameter is expanded. The ceramic bar 22, to both ends of which the elastic members 23 have been fitted, is arranged between the holding sections 21, which are opposed to each other, while these elastic members 23 are compressed.

When the ceramic bar 22 is actually arranged between the holding sections 21 opposed to each other, first, the ceramic bar 22 is arranged between the holding sections 21, and then the elastic members 23 are fitted to both ends of the ceramic bar 23 while the elastic members 22 are being compressed.

As described above, the ring-shaped holding member 20 is composed in such a manner that the ceramic bar 22 is arranged between the holding sections 21, which are opposed to each other, via the elastic members 23 in the metallic cylinder 12. The thus composed ring-shaped holding member 20 is inserted into the external metallic cylinder 1 from the side of the extending section 11 as shown in FIG. 1(b). Then, the ring-shaped holding member 20 is fixed under the condition that the plane 22A of the ceramic bar 22 comes into contact with the bottom surface 15 of the honeycomb body 7. Under the above condition, the ceramic bar 22 functions as a retainer to prevent the occurrence of telescoping of the honeycomb body 7, and this ceramic bar is held by the ring-shaped holding member 20.

Figure 3C:
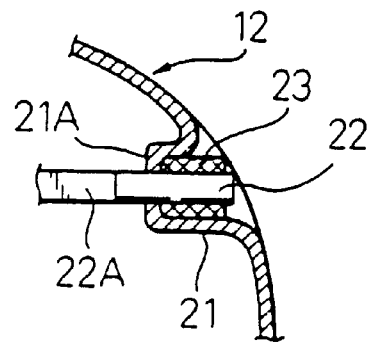
FIG. 3(c) is a partially cross-sectional view showing another example of the portion A shown in FIG. 3(a).

When a flange section 21A is formed at the end of the holding section 21 in the metallic cylinder 12 as shown in FIG. 3(c), there is no possibility that the elastic member 23 is disconnected from the holding section 21 into the metallic cylinder 12. In this example, two sets of holding sections 21, which are opposed to each other, are formed in the metallic cylinder 12, and the ceramic bar 22 is arranged to each set of holding sections 21 via the elastic members 23. However, it should be noted that the number of sets of holding sections 21 is not limited to two, that is, the number of ceramic bars 22 is not limited to two.

In the example described above, the honeycomb body 7 can be held by one assembling body composed of the metallic cylinder 12, the ceramic bar 22 and the elastic members 23. Accordingly, it is possible to provide the following effects.

(1) Reliability can be ensured when the assembling body is incorporated into the external cylinder 11. Therefore, labor can be saved in the manufacturing process. Accordingly, the manufacturing cost of the electrically heated catalyst device can be reduced.

(2) The area of the holding section 21 formed in the metallic cylinder 12 by means of preventing processing is larger than the area of the holding surface of a simple hole. Therefore, it is possible to prevent the ceramic bar 22 from being disconnected from the holding section, and it is also possible to prevent the abrasion of the holding section 21.

(3) Since the ceramic bar 22 is arranged inside the external metallic cylinder 1, no exhaust gas leaks outside from the insertion holes of the ceramic bars 22. Accordingly, it is not necessary to provide a specific member to be used for preventing the leakage of exhaust gas.

(4) The elastic member 23 reduces a deformation of the metallic cylinder 12 caused by a change in temperature. Also, the elastic member 23 reduces a force given to the ceramic bar 22 which is caused by strain originated from a change in temperature. Therefore, damage to the ceramic bar 22 can be prevented.

(5) The elastic member 23 absorbs a thermal expansion of the hole of the holding section 21. Accordingly, even when the temperature is changed, the ceramic bar 22 can be tightly fitted in the hole of the holding section 21.

(6) Since the elastic member 23 is attached to the holding section 21 under the condition of compression, it is possible to increase the dimensional tolerance of the hole formed in the holding section. Accordingly, the manufacturing cost of the ring-shaped holding member 20 can be reduced.

(7) When the ring-shaped holding member 20 to which the ceramic bar 22 is attached is arranged on the downstream side of the honeycomb body 7 in the external metallic cylinder 1, it is possible for the elastic member 23 to keep a contact surface pressure generated between the honeycomb body 7 and the ceramic bar 22 within a predetermined range. Accordingly, the assembling tolerance can be absorbed.

(8) When the flange portion 21A is formed in the holding section 21, it is possible to prevent the elastic member 23 from being disconnected from the holding section 21.

The electrically heated catalyst device described above is used being combined with the main catalyst device.

Figure 4:
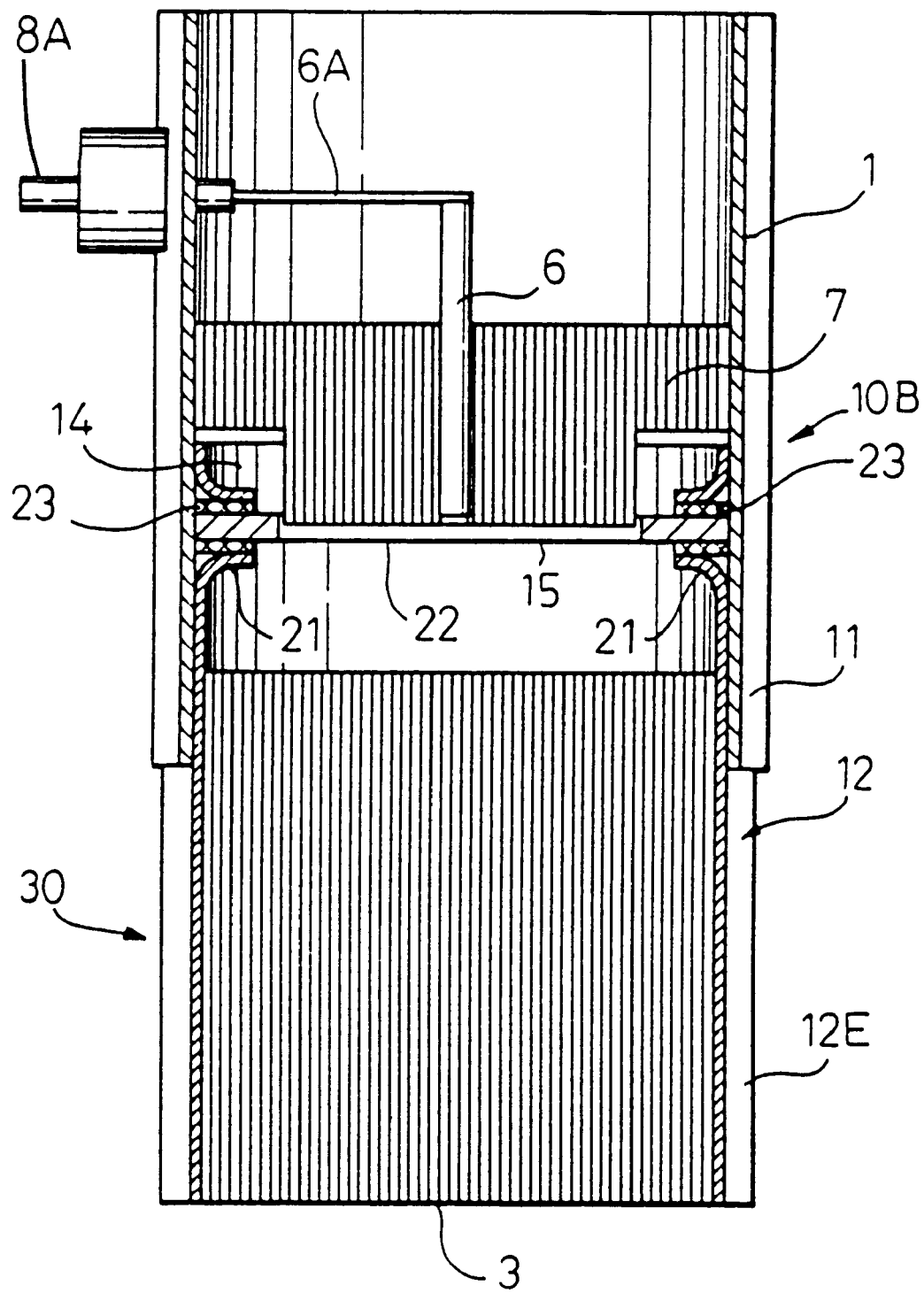
FIG. 4 is a cross-sectional view showing a structure of the electrically heated catalyst device of another example of the present invention.

FIG. 4 is a cross-sectional view showing a structure of the electrically heated catalyst device 10B of another example of the present invention. That is, FIG. 4 is a view showing a variation of the electrically heated catalyst device 10A shown in FIG. 1.

In the electrically heated catalyst device 10B described above, the skirt portion on the downstream side of the exhaust gas flow of the metallic cylinder 12, composed in the same manner as that of the example shown in FIG. 1, is formed as an extending section 12E which is extended exceeding the extending section 11 of the external metallic cylinder 1. The main catalyst device 30 is composed in such a manner that the main catalyst support 3 is arranged in this extending section 12E under the condition that the main catalyst support 3 is adjacent to the honeycomb body 7.

When the main catalyst support 3 is arranged in the extending section 12E of the metallic cylinder 12, the ring-shaped holding section 20 is integrated with the main catalyst device located on the downstream side. Therefore, welding portions can be avoided when the electrically heated catalyst device 10A shown in FIG. 1 is connected with the main catalyst device. Due to the foregoing, the reliability of the exhaust gas purifying device can be ensured, and further the manufacturing cost can be reduced. Since the main catalyst support 3 is arranged close to the honeycomb body 7 which is electrically heated, the warm-up property of the main catalyst support 3 can be enhanced.

Figure 5A:
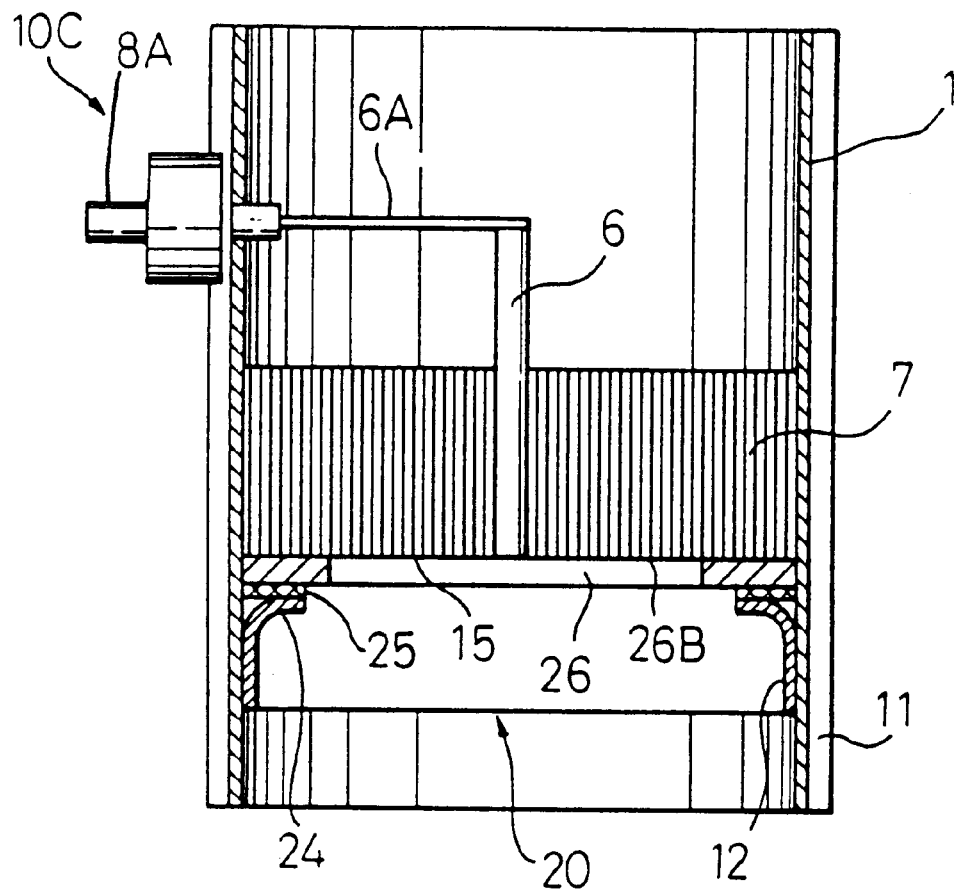
FIG. 5(a) is a cross-sectional view showing a structure of the electrically heated catalyst device of another example of the present invention.
Figure 6:
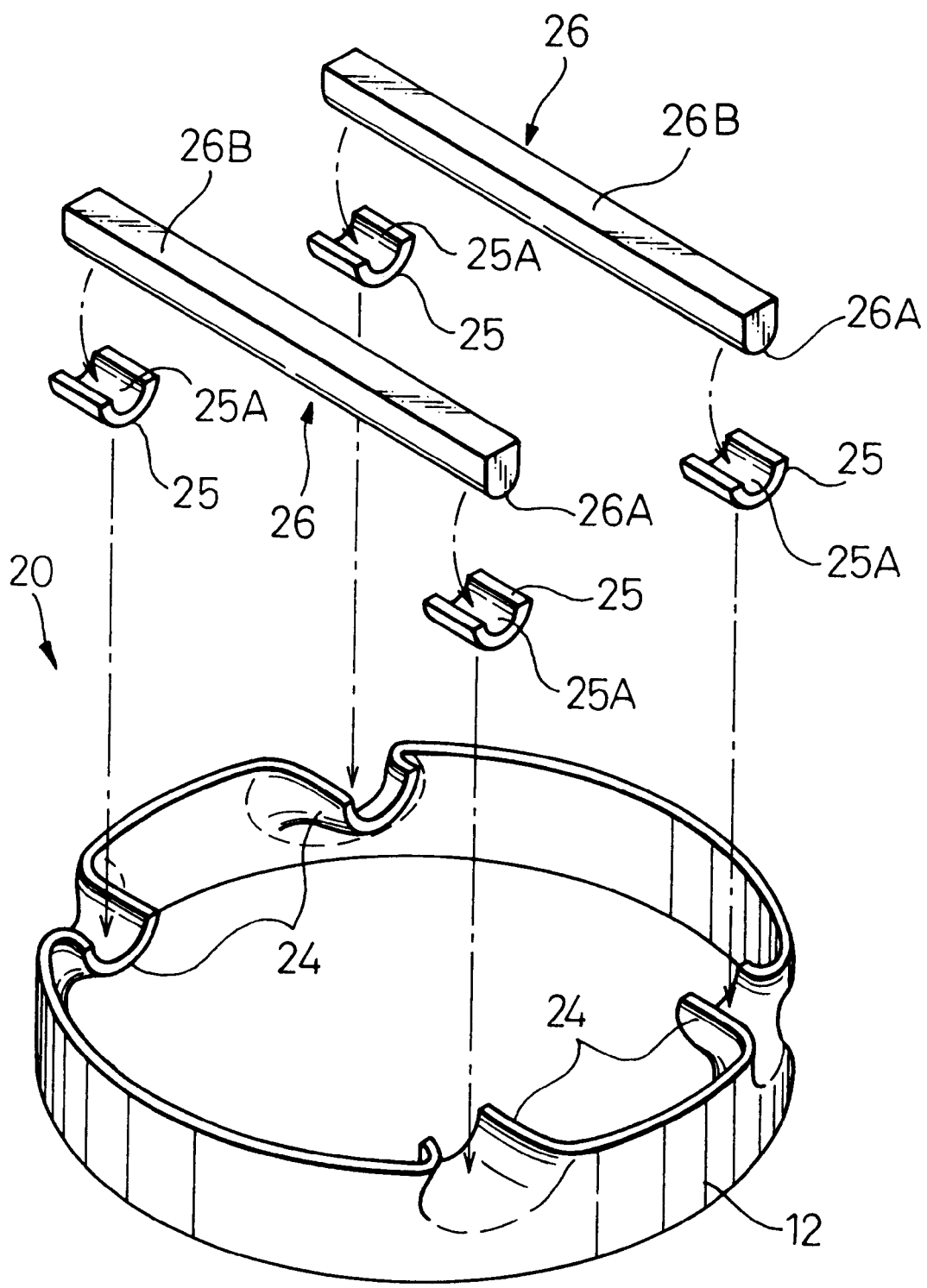
FIG. 6 is an assembling perspective view for explaining a state in which ceramic bars are attached to the ring holding member shown in FIG. 5(a) via elastic members.

FIG. 5(a) is a cross-sectional view showing an arrangement of the electrically heated catalyst device 10C of still another example. In this example, the shape of the holding section 24 formed in the metallic cylinder 12 composing the ring-shaped holding member 20 is not cylindrical but it is formed into a semi-circular gutter-shape as illustrated in FIG. 6. Consequently, the ring-shaped cut-away section 14 is not formed on the lower end face of the honeycomb body 7. In accordance with the semi-circular gutter-shape of the holding section 24, the shape of the elastic member 25 inserted into the holding section 24 is also formed into a semi-circular gutter-shape, that is, a shape of a split cylinder. The shape of the ceramic bar 26 is formed as follows. The shape of the ceramic bar 26 on the downstream side of exhaust gas is formed into a semi-circular curved surface 26A, and the shape of the ceramic bar 26 on the upstream side of exhaust gas is formed into a plane 26B.

Figure 5B:
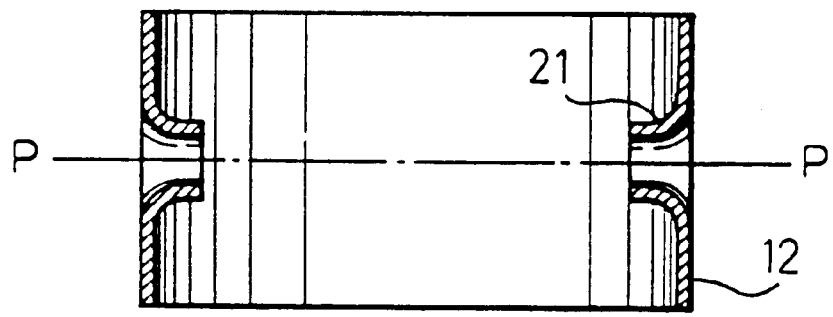
FIG. 5(b) is a cross-sectional view of a ring-shaped holding portion for explaining a manufacturing method of the holding member shown in FIG. 5(a).

The ring-shaped holding member 20 having the gutter-shaped holding sections 24 illustrated in FIG. 6 can be made as follows. For example, as shown in FIG. 5(b), the outer circumferential surface is subjected to preventing processing at a position located in such a manner that the distances from both end portions to the position can be the same, so that the cylindrical holding sections 21 protruding inside the metallic cylinder 12 can be formed. This metallic cylinder 12 is split into two portions along a line P—P which is parallel to both end surfaces of the metallic cylinder 12, and this line P—P passes through a position located in such a manner that the distances from both end faces to the position can be the same.

In this electrically heated catalyst device 10C, the gutter-shaped elastic members 25 are attached to all holding sections 24 of the metallic cylinder 12 shown in FIG. 6 while the gutter-shaped elastic members 25 are compressed. After that, the curved surfaces 26A at both end portions of the ceramic bar 26 are respectively pushed into the recesses 25A of the elastic members 25 which are opposed to each other. In this way, the assembling body to hold the honeycomb body 7 can be obtained.

As described above, the holding member 20 is composed in such a manner that the holding sections 24 are formed in the metallic cylinder 12 being opposed to each other, and the ceramic bar 26 is arranged between the holding sections 24 via the elastic members 25. As shown in FIG. 5(a), the holding member 20 is inserted into the external metallic cylinder 1 from the extending section 11 side and fixed to the external metallic cylinder 1 while the plane 26B of the ceramic bar 26 comes into contact with the bottom surface 15 of the honeycomb body 7. In the above condition, the ceramic bar 22 functions as a retainer of the honeycomb body 7 and is held by the ring-shaped holding member 20.

In this connection, it is possible to provide the following variation of this example. In the metallic cylinder 12 of the ring-shaped holding member 20, there is provided an extending section, and the main catalyst 3 is arranged in this extending section. This variation is not shown in the drawing.

Figure 7:
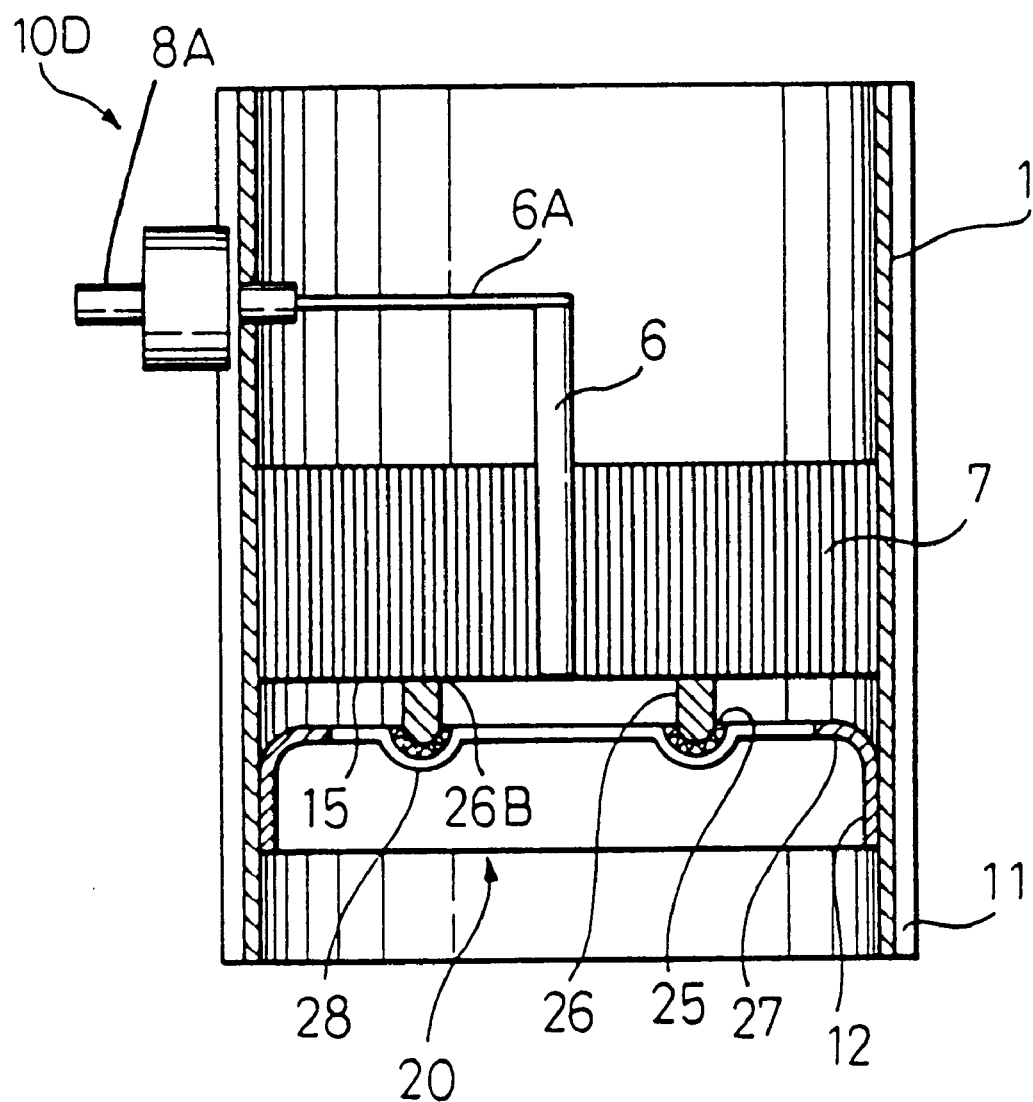
FIG. 7 is a cross-sectional view showing a structure of the electrically heated catalyst device on another example of the present invention.
Figure 8A:
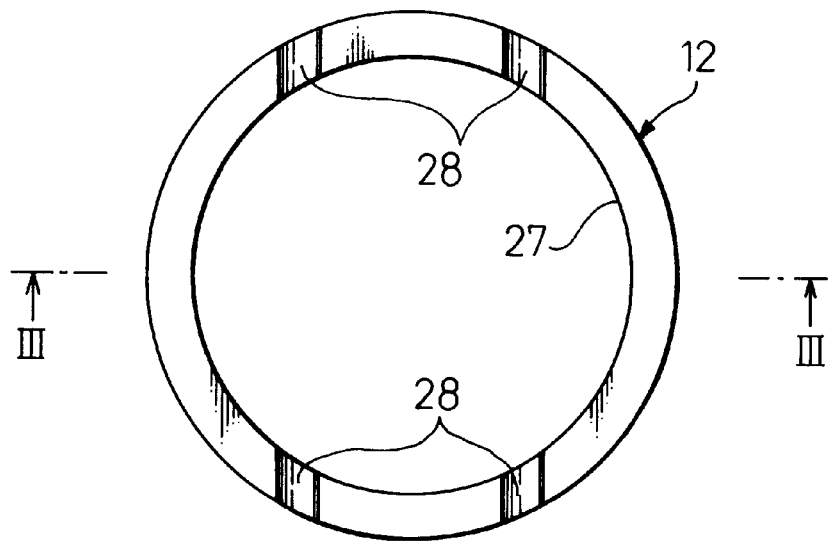
FIG. 8(a) is a plan view showing a shape of the ring holding member shown in FIG. 8(a).
Figure 8B:
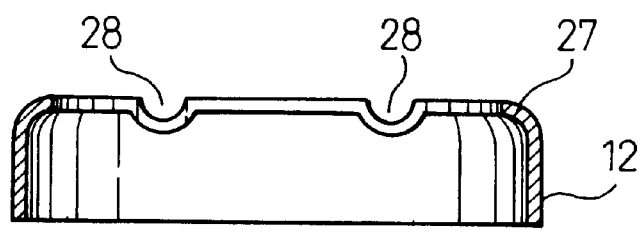
FIG. 8(b) is a cross-sectional view taken on line III—III in FIG. 8(a).
Figure 8C:
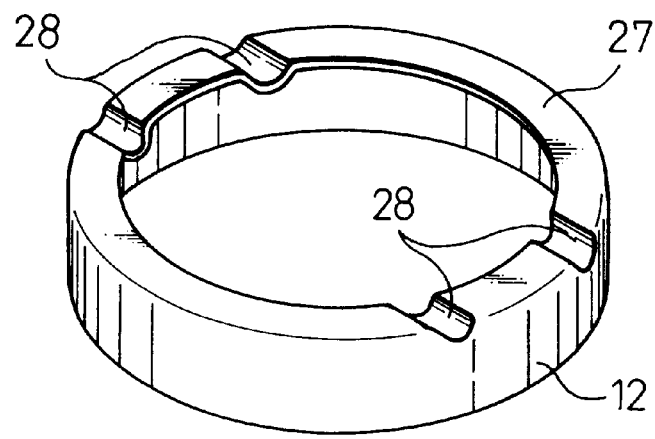
FIG. 8(c) is a perspective view of the ring-shaped holding member shown in FIG. 8(a).

FIG. 7 is a cross-sectional view showing the structure of the electrically heated catalyst device 10D of another example of the present invention. As shown in FIGS. 8(a) to 8(c), one end side of the metallic cylinder 12 composing the ring-shaped holding member 20 is bent inside over the entire circumference, so that a flange portion 27 can be formed. There are formed four recesses in this flange portion 27. These recesses are the gutter-shaped holding sections 28. Two of the holding sections 28 are arranged being opposed to each other while the gutter-shaped recesses are continuously located on the same axis interposing the inside space of the metallic cylinder 12. These two sets of holding sections 28 are located at the same positions as those of the holding sections 24 in the example shown in FIG. 6.

Since the holding sections 28 are formed into the gutter-shape in this example as described above, the elastic members 25 can be inserted into the holding sections 28 in the same manner as that of the example shown in FIG. 6, and the ceramic bar can be inserted into the elastic members in the same manner as that of the example shown in FIG. 6.

In the electrically heated catalyst device 10D of the above example, the gutter-shaped elastic members 25 are attached to all holding sections 28 of the metallic cylinder 12 shown in FIGS. 8(a) to 8(c), and the curved surfaces 26A are respectively pushed into the gutter-shaped recesses 25A of the elastic members 25 at both end portions of the ceramic bar 26. In this way, the assembling body to hold the honeycomb body 7 can be obtained.

As described above, in the holding member 20, the ceramic bars 26 are arranged between the holding sections 28, which are formed in the flange section 27 being opposed to each other, via the elastic members 25. As shown in FIG. 7, the holding member 20, which is formed in the above manner, is inserted into the metallic cylinder 1 from the extending section 11 side and fixed while the planes 26B of the ceramic bars 26 come into contact with the bottom surface 15 of the honeycomb body 7. In the above condition, the ceramic bar 22 functions as a retainer of the honeycomb body 7 and is held by the ring-shaped holding member 20.

In the electrically heated catalyst device 10D shown in FIG. 7, one end portion of the metallic cylinder 12 composing the ring-shaped holding member 20 is bent and formed into the flange section 27. Accordingly, the rigidity of the entire ring-shaped holding member 20 can be enhanced, and the possibility of thermal deformation can be excluded. The flange section 27 closes a periphery of the outer circumference of the honeycomb body 7. Therefore, it is possible to prevent the exhaust gas sent from the outer circumference, the rate of purification of which is low because the warm-up characteristic is low, from blowing through onto the downstream side.

In this connection, it is possible to provide the following variation of this example. In the metallic cylinder 12 of the ring-shaped holding member 20, there is provided an extending section, and the main catalyst 3 is arranged in this extending section. This variation is not shown in the drawing.

Figure 9:
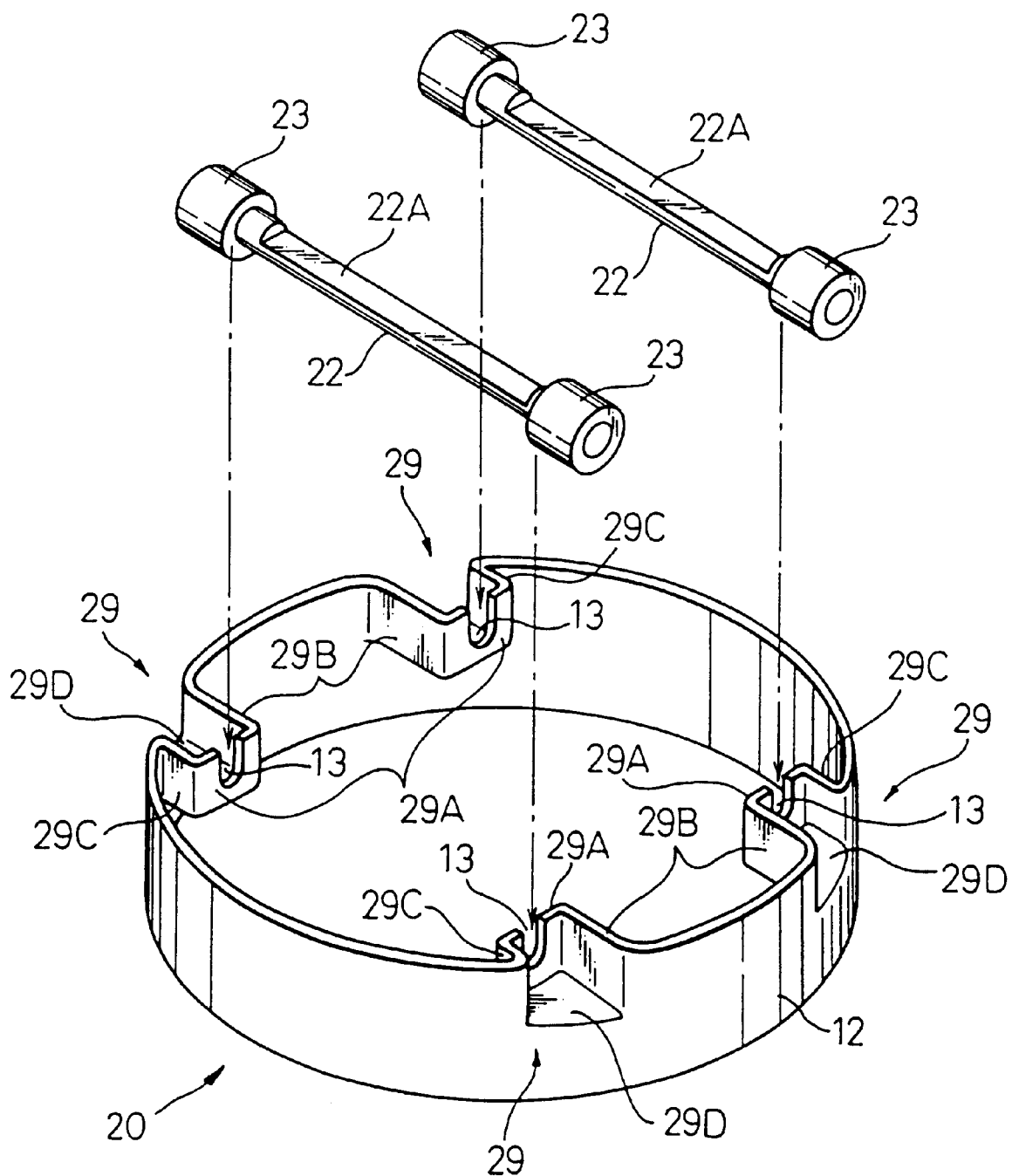
FIG. 9 is an assembling perspective view for explaining a structure of the ring-shaped holding member in the electrically heated catalyst device of another example of the present invention and also for explaining a state in which the ceramic bars are attached to the ring-shaped holding member via the elastic members.

FIG. 9 is a perspective view showing only the structure of the ring-shaped holding member 20 in the electrically heated catalyst device of another example of the present invention. In this example, an upper end portion of the metallic cylinder 12 is recessed by means of press forming, so that four rectangular holding sections 29 can be formed. Each holding section 29 includes three side walls 29A, 29B, 29C and one bottom surface 29D. Distance from each bottom surface 29D to the end portion of the metallic cylinder 12 is the same with respect to all holding sections 29. The side walls 29B, 29C of one holding section 29 are respectively located on the same surfaces of the side walls 29B, 29C of the other holding section 29 which is opposed to the aforementioned holding section 29. On each side wall 29A, there is formed a groove 13 for accommodating the ceramic bar. In this example, it is possible to use the same ceramic bars 22 and elastic members 23 as those used in the example shown in FIG. 1. In this case, it is necessary to determine the distance between the side wall 29B and the side wall 29C to be smaller than the outer diameter of the elastic member 23.

In the example shown in FIG. 9, the ceramic bar 22 is guided by the side wall 29A of the holding section 29 and inserted into the accommodating groove 13. In the process of insertion of the ceramic bar 22, the elastic members 23 attached to both end portions of the ceramic bar 22 are compressed and pushed between the side walls 29B and 29C of the holding section 29. In this way, the ring-shaped holding member 20 can be assembled.

As described above, in the ring-shaped holding member 20, the ceramic bars 22 are arranged between the holding sections 29, which are formed in the metallic cylinder 12 opposed to each other, via the elastic members 23. As shown in FIG. 1, the ring-shaped holding member 20, which is formed in the above manner, is inserted into the metallic cylinder 1 from the extending section 11 side and fixed while the planes 22B of the ceramic bars 22 come into contact with the bottom surface 15 of the honeycomb body 7. In the above condition, the ceramic bar 22 functions as a retainer of the honeycomb body 7 and is held by the ring-shaped holding member 20.

The electrically heated catalyst device of the example shown in FIG. 9 can provide the same effect as that provided by the electrically heated catalyst device 10A of the example shown in FIG. 1.

In this connection, it is possible to provide the following variation of the example shown in FIG. 9. In the metallic cylinder 12 of the ring-shaped holding member 20, there is provided an extending section, and the main catalyst 3 is arranged in this extending section. This variation is not shown in the drawing.

FIGS. 10(a), 10(b) and FIGS. 11(a), 11(b) are views showing the electrically heated catalyst devices 10E, 10F of another example of the present invention. In the catalyst support of this example, there is provided an outer circumferential section reinforcing layer 7o on the outer circumference of the honeycomb body 7. In this catalyst support, ceramic bars are held via the ring-shaped holding member.

The electrically heated catalyst support used in this example is composed as follows. On the outer circumferential layers, the number of which is approximately 5, and on the inner circumferential layers, the number of which is approximately 5, which are arranged, if necessary, at positions close to the central electrode 6 of the honeycomb body 7, as illustrated in FIGS. 12(b) and 12(c), the joint portion 45 of the flat foil 5 and the corrugated foil 4 is densely formed for the purpose of ensuring mechanical strength, so that the outer circumferential reinforcing layer 7o and the inner circumferential reinforcing layer 7i can be formed, and the inner circumferential reinforcing layer is connected to the central electrode 6, and the outer circumferential reinforcing layer is connected to the external metallic cylinder 1. As a result, the honeycomb body 7 and the external metallic cylinder 1 are integrated with each other into one body.

Figure 12A:
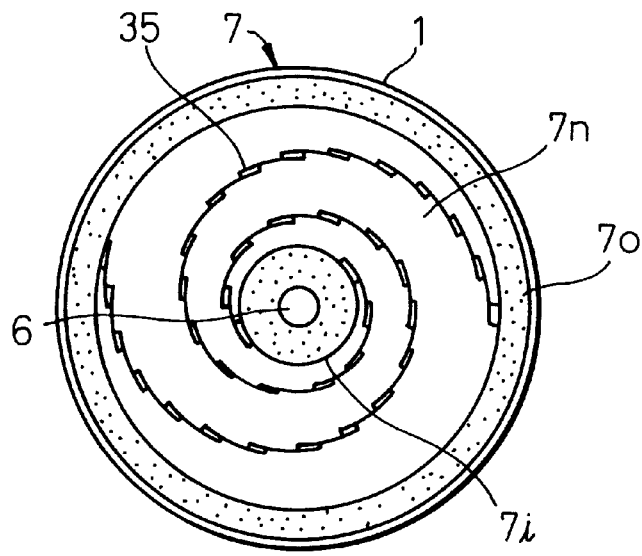
FIG. 12(a) is a plan view of the electrically heated catalyst support showing an example of the joint section arrangement and the reinforcing layer arrangement to form an electrically heated section.
Figure 12B:
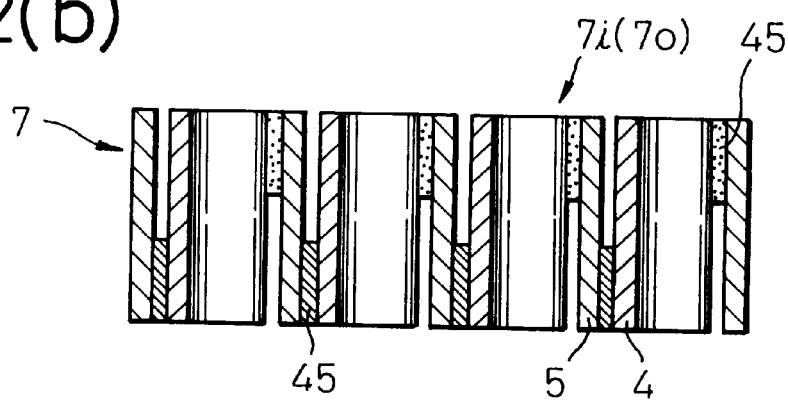
FIG. 12(b) is a partially cross-sectional front view showing an example of the structure of the reinforcing layer.
Figure 12C:
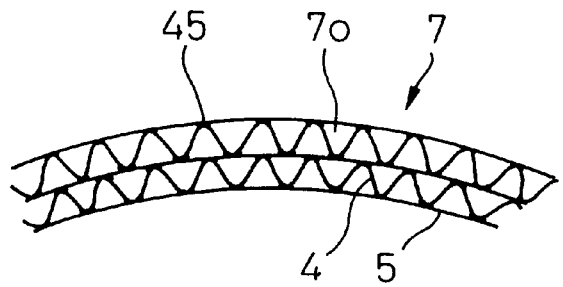
FIG. 12(c) is a partially enlarged plan view of the reinforcing layer.

FIG. 12(a) is a view showing an electric current passage 35 spirally formed from the central side to the outer circumferential side by joining the sheets of metallic foil locally when each metallic foil is formed into a spiral shape.

The electrically heated catalyst support shown in FIGS. 10, 11 are composed as follows. On the outer circumference of the honeycomb body 7, at least one joining reinforcing layer 7o is formed, and this outer circumferential reinforcing layer 7o is joined to the external metallic cylinder 1, and the ceramic bars 31, 33 are arranged on the end surface of the honeycomb body 7 on the downstream side of exhaust gas in such a manner that the ceramic bars 31, 33 cross the non-reinforcing layer 7n of the honeycomb body, and end portions of these ceramic bars are fixed by the ring-shaped fixing members 32, 34 joined to the external metallic cylinder 1.

Figure 10A:
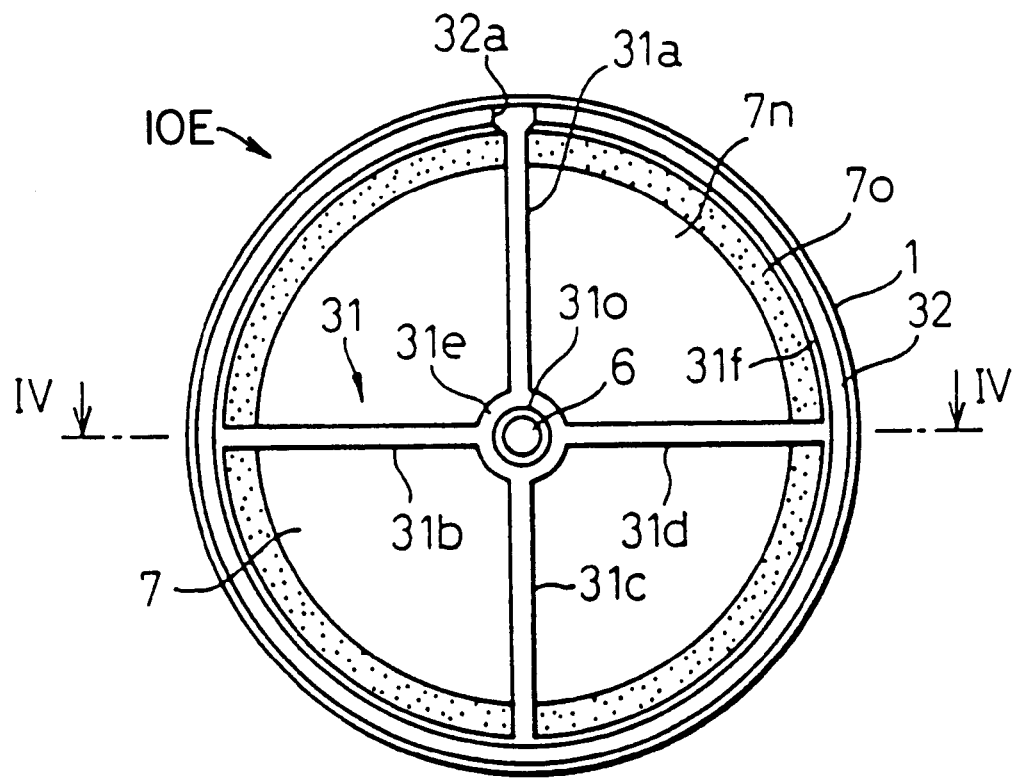
FIG. 10(a) is a bottom view on the downstream side of exhaust gas showing an example of the ceramic bar holding structure of the electrically heated catalyst support of another example of the present invention.
Figure 10B:
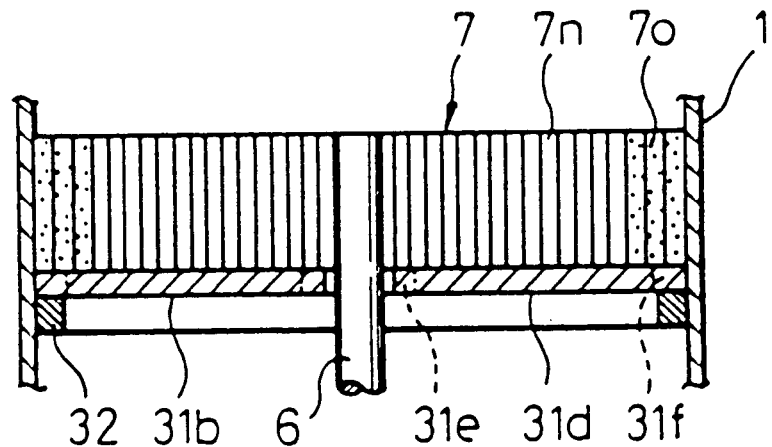
FIG. 10(b) is a cross-sectional view taken on line IV—IV in FIG. 10(a).

The electrically heated catalyst support shown in FIGS. 10(a), 10(b) is composed as follows. There is provided a cross-shaped ceramic bar 31 including four legs 31a, 31b, 31c, 31d, and the annular sections 31e, 31f are formed at the end portions of these four legs. The central electrode 6 is loosely engaged in the hole 31o formed at the center of the above ceramic bar 31, and each leg is arranged in such a manner that it crosses the non-reinforcing layer 7n, and the annular sections 31f at the ends of the four legs located on the outer circumferential reinforcing layer 7o are supported by the ring-shaped holding member 32. When this holding member is joined to the external metallic cylinder 1, the honeycomb body 7 can be supported. In one portion of the ring-shaped holding member 32, there is provided a clearance section 32a, by which a stress generated by a heat cycle can be released.

Figure 11A:
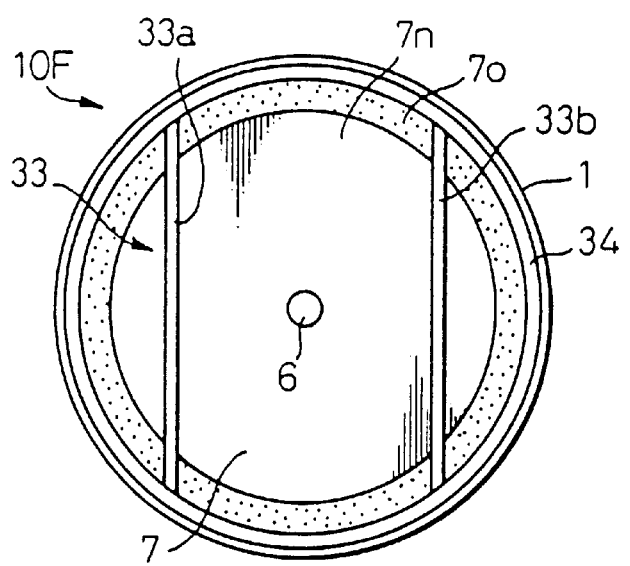
FIG. 11(a) is a bottom view of the downstream side of exhaust gas showing an example of the ceramic bar holding structure of the electrically heated catalyst support of still another example of the present invention.
Figure 11B:
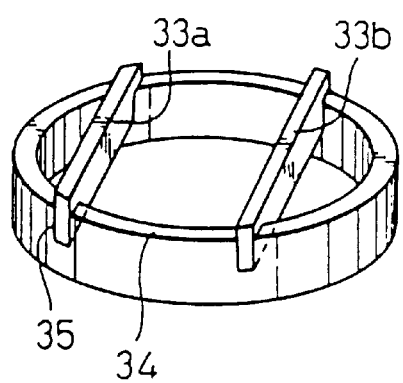
FIG. 11(b) is a perspective view showing an engaging condition of the ceramic bars and the ring-shaped holding section illustrated in FIG. 11(a).

In the electrically heated catalyst support shown in FIGS. 11(a), 11(b), two ceramic bars 33a, 33b are arranged so that they can cross the non-reinforcing layer 7n, and the end portions of the ceramic bars located on the outer circumferential reinforcing layer 7o are supported by the ring-shaped holding member 34. When this holding member is joined to the external metallic cylinder 1, the honeycomb body 7 can be supported.

In this case, engaging grooves 35 are formed in the ring-shaped holding member 34. These engaging grooves 35 are engaged with the end portions of the ceramic bars 33a, 33b, so that the two ceramic bars 33a, 33b are not disconnected from the ring-shaped holding member 34.

Figure 13A:
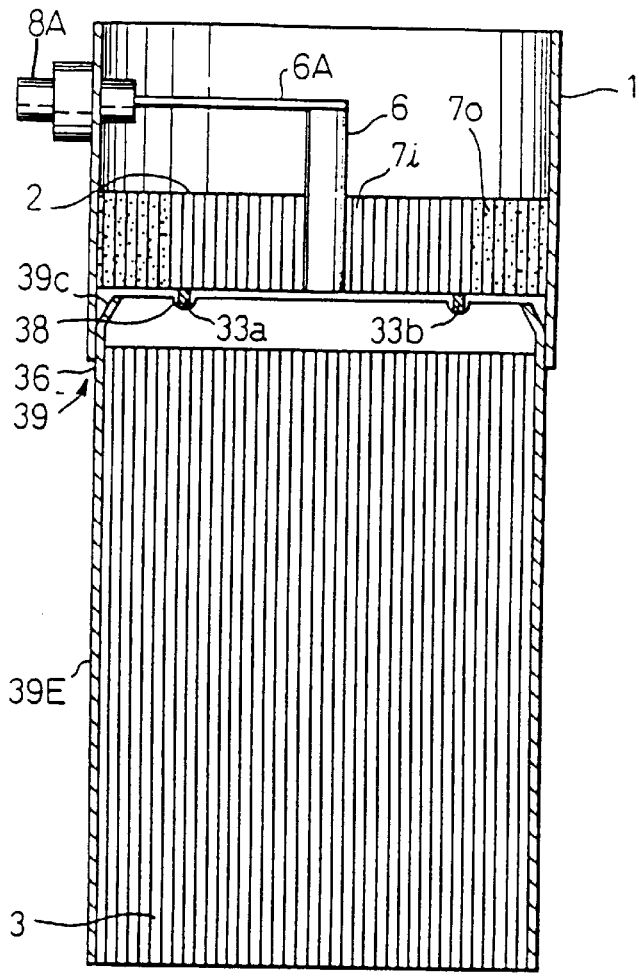
FIG. 13(a) is a cross-sectional front view of the exhaust gas purifying device of an example of the present invention.

FIG. 13(a) is a view showing an example of the electrically heated catalyst device in which a reducing section 39C is formed instead of the recesses 37 shown in FIG. 11 at the end of the metallic cylinder 39 of the ring-shaped holding member 36, and an extending section 39E is formed by extending the metallic cylinder 39 onto the downstream side of exhaust gas, and the main catalyst support 3 is arranged in the extending section 39E. In the electrically heated catalyst device shown in FIG. 13(b), the ring-shaped holding member 36 is arranged on the downstream side of exhaust gas of the purifying device.

In any example described above, it is possible to hold the catalyst support in a state in which the ceramic bars are stably supported. The number of parts can be reduced and the manufacturing cost can be reduced.

Next, the following are the explanations of a case in which pins are used as members to hold the ceramic bars.

Figure 29:
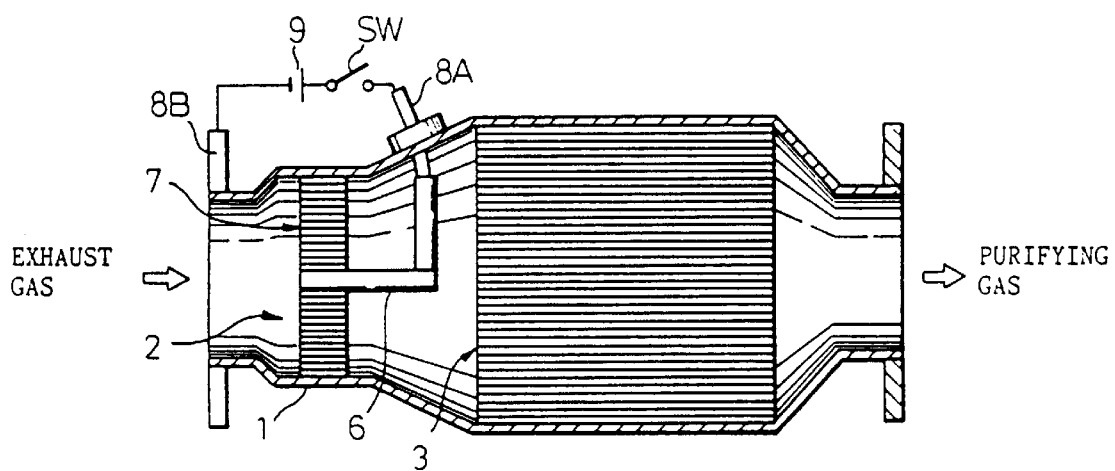
FIG. 29 is a cross-sectional front view showing an example of the structure of the conventional exhaust gas purifying device.

First, explanations are made for a case in which the present invention is applied to the exhaust gas purifying device shown in FIG. 29.

Figure 14:
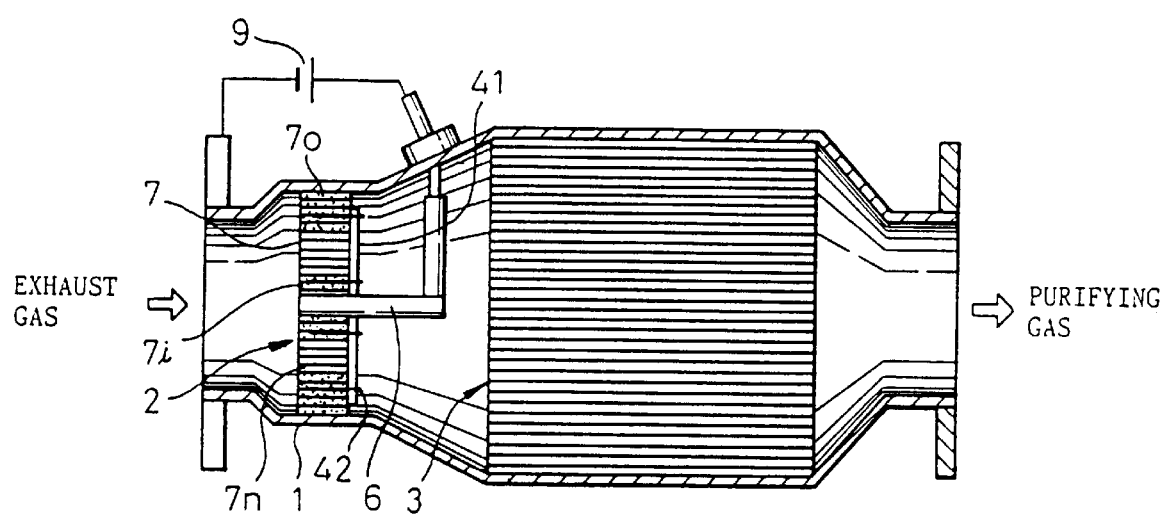
FIG. 14 is a cross-sectional front view of the exhaust gas purifying device of an example of the present invention.

As shown in FIG. 14, in this example, the electrically heated catalyst device 10G is composed as follows. The electrically heated catalyst support 2 includes a honeycomb body 7 having an outer circumferential portion reinforcing layer 7o and an inner circumferential portion reinforcing layer 7i. There are provided ceramic bars 41 on the downstream side of exhaust gas of this catalyst support 2. Both end portions of these ceramic bars 41 are held by pins 42. The aforementioned electrically heated catalyst device 10G is arranged in the exhaust gas purifying device.

An example of the ceramic bar described above is shown in FIGS. 15(a) to 15(e).

Figure 15A:
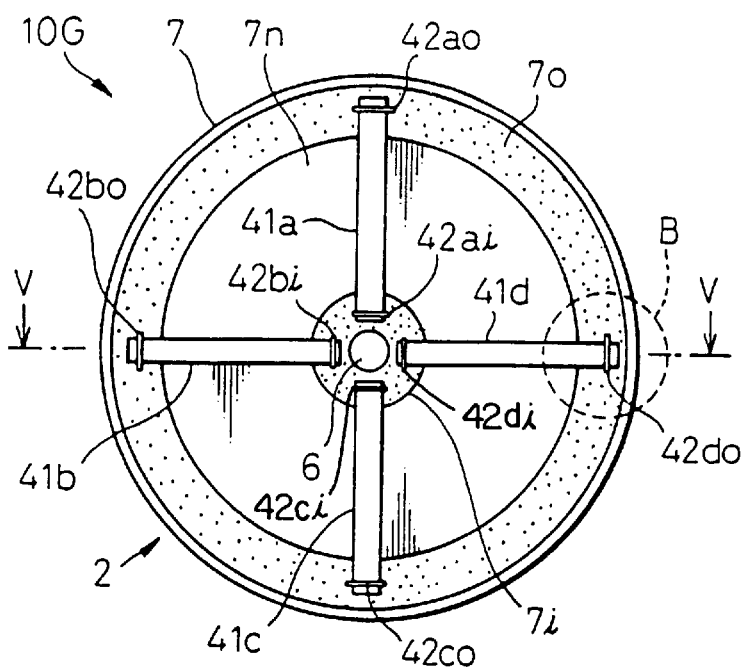
FIG. 15(a) is a bottom view on the downstream side of exhaust gas of the electrically heated catalyst support shown in FIG. 14.
Figure 15B:
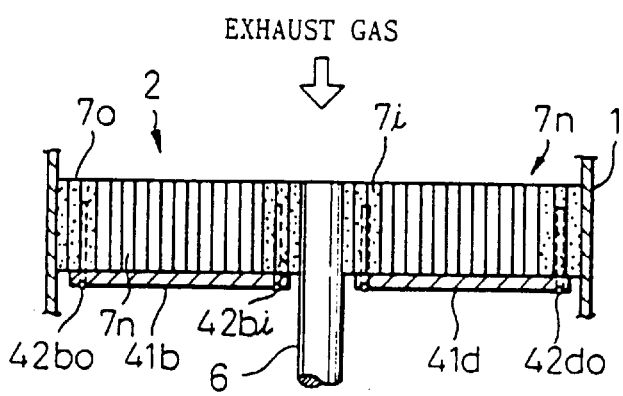
FIG. 15(b) is a cross-sectional view taken on line V—V in FIG. 15(a).
Figure 15C:
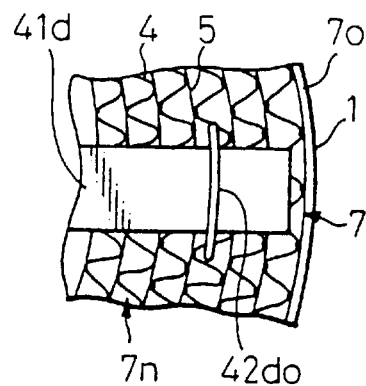
FIG. 15(c) is an enlarged schematic illustration showing an outline of the section B in FIG. 15(a).
Figure 15D:
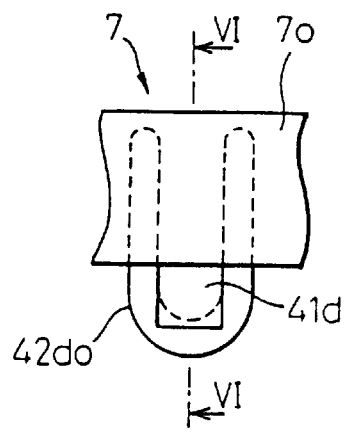
FIG. 15(d) is a partially enlarged view showing an example of fixing the end portion of the ceramic bars, the U-shaped pin and the reinforcing layer.
Figure 15E:
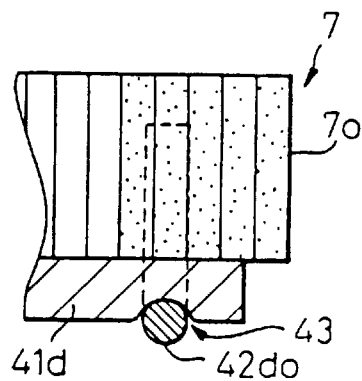
FIG. 15(e) is a cross-sectional view taken on line VI—VI in FIG. 15(d).

FIG. 15(a) is a bottom view of the electrically heated catalyst support 10G. FIG. 15(b) is a cross-sectional view taken on line V—V in FIG. 15(a). FIG. 15(c) is an enlarged schematic illustration showing an outline of the section B in FIG. 15(a). FIG. 15(d) is an enlarged side view of the FIG. 15(b). FIG. 15(e) is a cross-sectional view taken on line VI—VI in FIG. 15(d).

In FIGS. 15(a) to 15(e), between the inner circumferential section reinforcing layer 7i and the outer circumferential section reinforcing layer 7o, there are provided four ceramic bars 41a, 41b, 41c, 41d, which are formed into a cross-shape, while these ceramic bars 41a, 41b, 41c, 41d cross the non-reinforcing layer section 7n of the honeycomb body 7 in a contact condition. The end portions of these ceramic bars which are put on the inner circumference reinforcing layer 7i are engaged by U-shaped pins 42ai to 42di. That is, the head portions of these U-shaped pins engage with the ceramic bars, so that the head portions of these U-shaped pins can hold the ceramic bars. The end portions of these U-shaped pins are inserted into the inner circumference reinforcing layer 7i and soldered to the walls of this inner circumference reinforcing layer 7i. Due to the above arrangement, one end portion of the ceramic bar prevents the slippage caused between the sheets of metallic foil while a change in the shape of the honeycomb body 7 is allowed.

End portions of the above ceramic bars which are put on the outer circumference reinforcing layer 7o are engaged by the U-shaped pins 42ao to 42do in the same manner as that described before.

In this case, as shown in the enlarged views of FIGS. 15(d) to 15(e), in order to prevent the disconnection of ceramic bars and ensure the engagement of ceramic bars more positively, engaging grooves 43 having a slight inclination are formed in the engaging sections of the U-shaped pins 42 attached to both end portions of each ceramic bar.

Figure 16A:
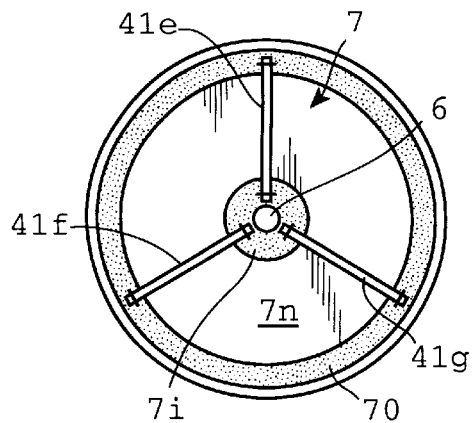
FIGS. 16(a) to 16(e) are bottom views on the downstream side of exhaust gas showing examples of the arrangement of ceramic bars of the electrically heated catalyst support of the present invention.

FIGS. 16(a) to 16(e) are views showing another example of the arrangement of the ceramic bar of the above example. FIG. 16(a) is a view showing an example of the arrangement of the ceramic bar composed as follows. In the honeycomb body 7, there are provided an inner circumference reinforcing layer 7i and an outer circumference reinforcing layer 7o. Three ceramic bars 41e, 41f, 41g are arranged between the inner circumference reinforcing layer 7i and the outer circumference reinforcing layer 7o in such a manner that the three ceramic bars 41e, 41f, 41g cross the non-reinforcing layer 7n of the honeycomb body in a contact condition, while the three ceramic bars 41e, 41f, 41g are arranged at regular intervals of 120°.

Figure 16B:
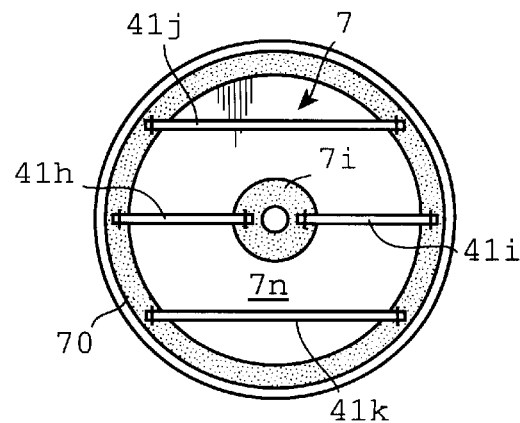

FIG. 16(b) is a view showing an example of the arrangement of the ceramic bars composed as follows. In the honeycomb body, there are provided an inner circumference reinforcing layer 7i and an outer circumference reinforcing layer 7o. Two ceramic bars 41h, 41i are arranged between the inner circumference reinforcing layer 7i and the outer circumference reinforcing layer 7o so that the two ceramic bars 41h, 41i can cross the non-reinforcing layer 7n of the honeycomb body in a substantial contact condition while the two ceramic bars 41h, 41i are arranged at regular intervals forming an angle of 180°. Further two ceramic bars 41j, 41k are arranged in a space surrounded by the outer circumference reinforcing layer 7o so that the two ceramic bars 41j, 41k can cross the non-reinforcing layer 7n of the honeycomb body in a substantial contact condition while the two ceramic bars 41j, 41k are arranged in parallel to each other. In this case, the two ceramic bars 41j, 41k are arranged symmetrically to each other with respect to the ceramic bars 41h, 41i.

Figure 16C:
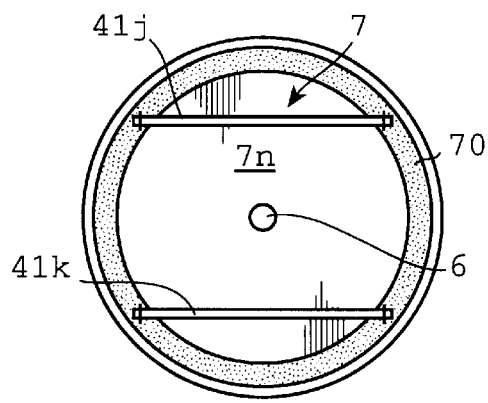

FIG. 16(c) is a view showing an example of the arrangement of the ceramic bars composed as follows. In the honeycomb body 7, there is provided an outer circumference reinforcing layer 7o. Two ceramic bars 41j, 41k, are arranged in a space surrounded by the outer circumference reinforcing layer 7o so that the two ceramic bars 41j, 41k can cross the non-reinforcing layer 7n of the honeycomb body in a substantial contact condition while the two ceramic bars 41j, 41k are arranged in parallel to each other.

Figure 16D:
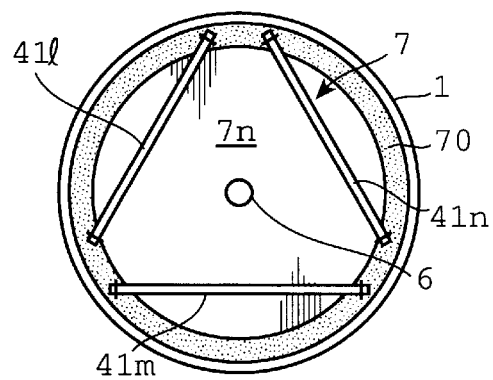

FIG. 16(d) is a view showing an example of the arrangement of the ceramic bars composed as follows. In the honeycomb body 7, there is provided an outer circumference reinforcing layer 7o. Three ceramic bars 41l, 41m, 41n are arranged in a space surrounded by the outer circumference reinforcing layer 7o so that the three ceramic bars 41l, 41m, 41n can cross the non-reinforcing layer 7n in a substantial contact condition and while these ceramic bars are arranged in a triangle.

Figure 16E:
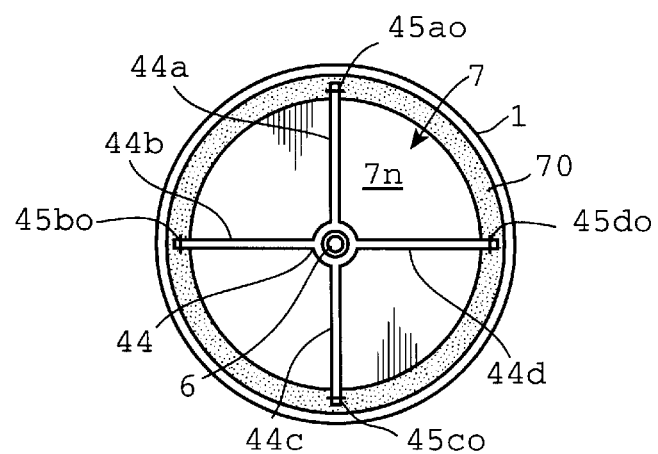

FIG. 16(e) is a view showing an example of the arrangement of the ceramic bars composed as follows. In the honeycomb body 7, there is provided an outer circumference reinforcing layer 7o. The ceramic bar 44 has four legs 44a, 44b, 44c, 44d, which are arranged in a cross shape. A central electrode 6 is loosely engaged in the center of this cross-shaped ceramic bar 44, wherein a sufficiently large clearance is made between the central electrode 6 and the center of the cross-shaped ceramic bar 44. In this case, the four legs are arranged so that they cross the non-reinforcing layer 7n of the honeycomb body in a substantial contact condition. End portions of the four legs of the ceramic bar 44 are fixed to the outer circumference reinforcing layer 7o via U-shaped pins 45ao to 45do.

In the examples shown in FIGS. 16(c) to 16(e), concerning the reinforcing layer of the honeycomb body, it is necessary to provide an outer circumference reinforcing layer, but it is unnecessary to provide an inner circumference reinforcing layer.

As described above, the non-reinforcing layer of the honeycomb body is strongly supported by the ceramic bars arranged between the reinforcing layers of the honeycomb body joined to the central electrode and the casing. When an electric current is fed to this honeycomb body, no current flows to the ceramic bars, so that the generation of heat in the electric passage of the honeycomb body is not obstructed.

In the above examples, the ceramic bars are held by the reinforcing layer formed in the honeycomb body, that is, although the ceramic bars are contacted with the honeycomb body, they are not fixed to the honeycomb body. Accordingly, the above holding structure is appropriate for holding the ceramic bars when they are subjected to thermal expansion, and no damage is caused by a difference in thermal expansion. As a result, there is no possibility that the honeycomb body is shifted in the direction of the exhaust gas flow or in the radial direction. Accordingly, the external metallic cylinder can be reliably held, and the durability of the electrically heated catalyst support can be enhanced.

Next, another example of the electrically heated catalyst device will be explained as follows. In this electrically heated catalyst device, there is provided an electricity introducing section in the external metallic cylinder on the upstream side of exhaust gas of the electrically heated catalyst support. There is provided a main catalyst device at a position close to this electrically heated catalyst device through ceramic bars.

Figure 17:
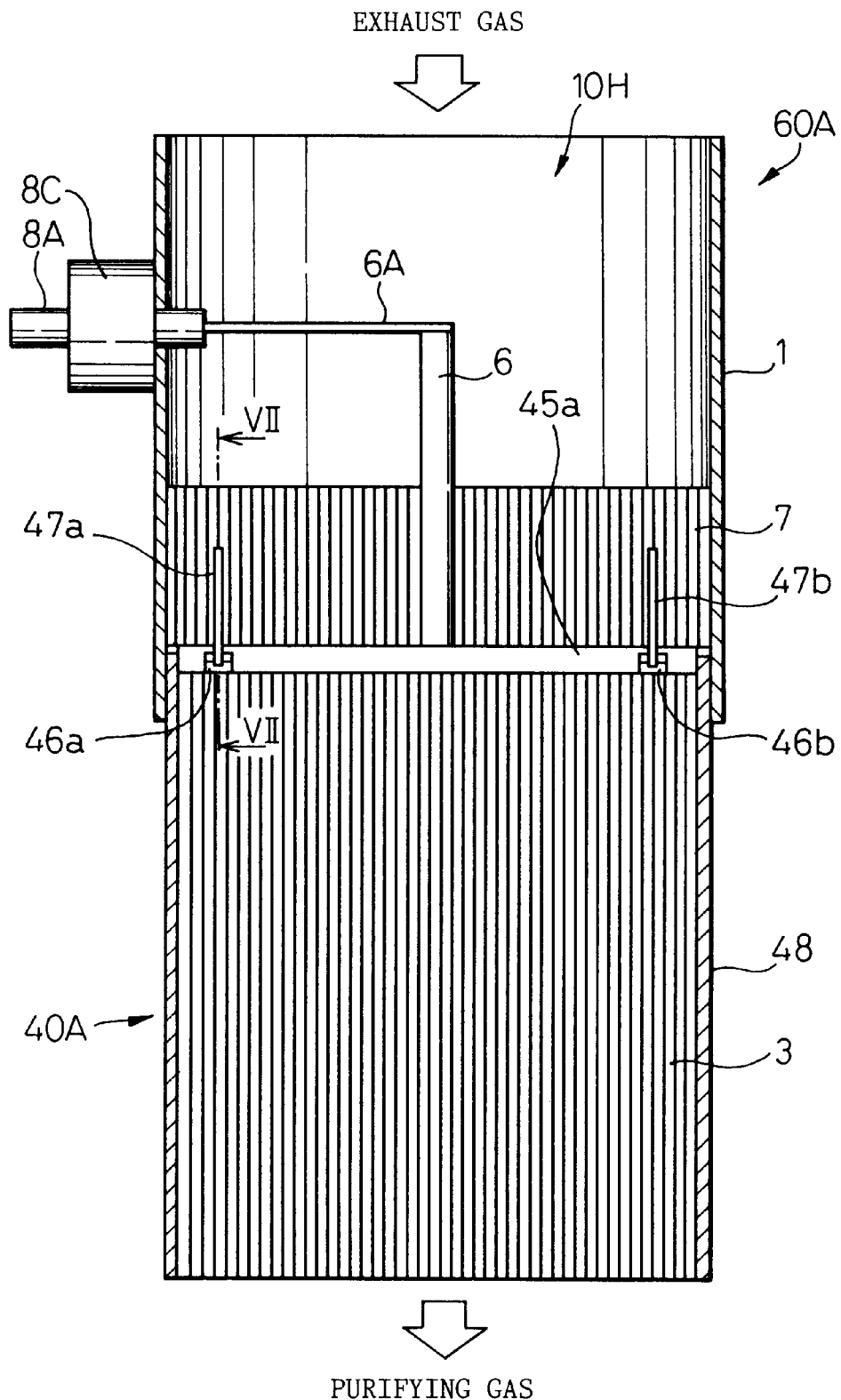
FIG. 17 is a cross-sectional front view of the exhaust gas purifying device of the internal combustion engine of still another example of the present invention.
Figure 30A:
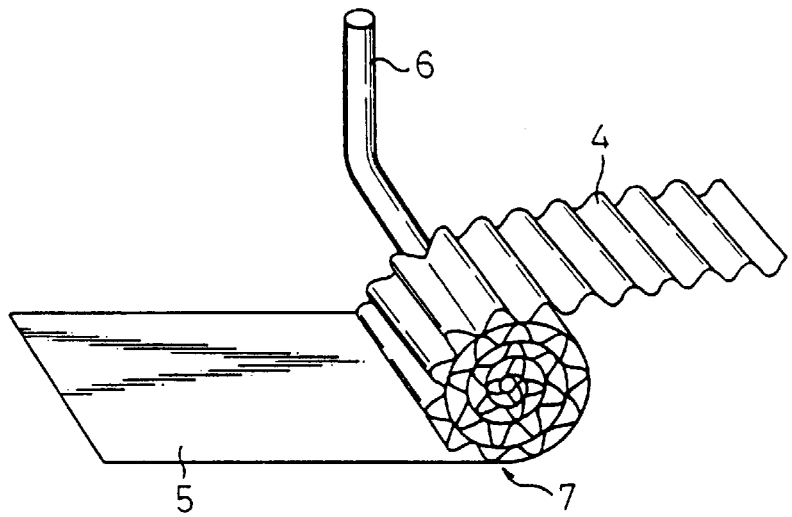
FIG. 30(a) is a partially perspective view for explaining a method of forming a well-known honeycomb body.
Figure 30B:
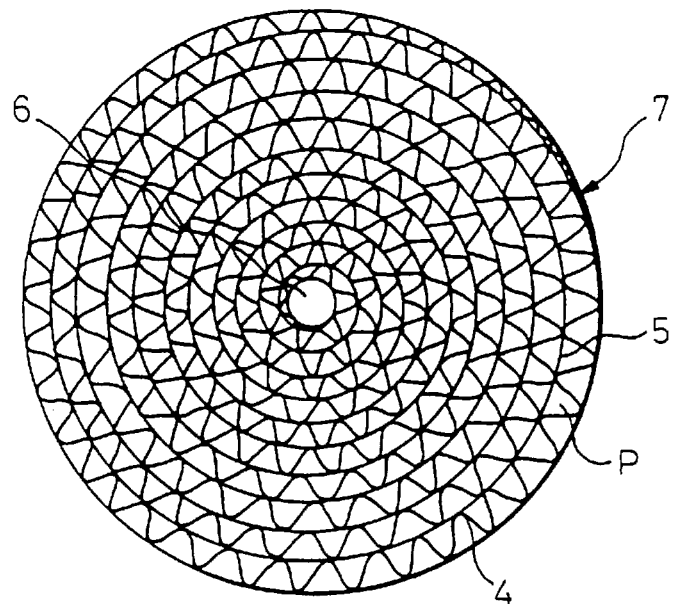
FIG. 30(b) is a plan view showing an outline of the end face of the honeycomb body wound by the forming method shown in FIG. 30(a).

FIG. 17 is a cross-sectional front view of the exhaust gas purifying device 60A of the internal combustion engine having the electrically heated catalyst device 10H of the above example of the present invention. As shown in FIG. 17, the exhaust gas purifying device 60A includes an electrically heated catalyst device 10H and a main catalyst device 40A. The electrically heated catalyst device 10H is composed in such a manner that the honeycomb body 7 including the corrugated foil 4 and the flat foil 5 explained in FIGS. 30(a), 30(b) is inserted into the external metallic cylinder 1. At the center of the honeycomb body 7, there is provided a central electrode 6, which is connected to the electrode section 8A via the lead section 6A penetrating the holder 8C which is arranged on the outer circumferential surface of the external cylinder 1.

Figure 18:
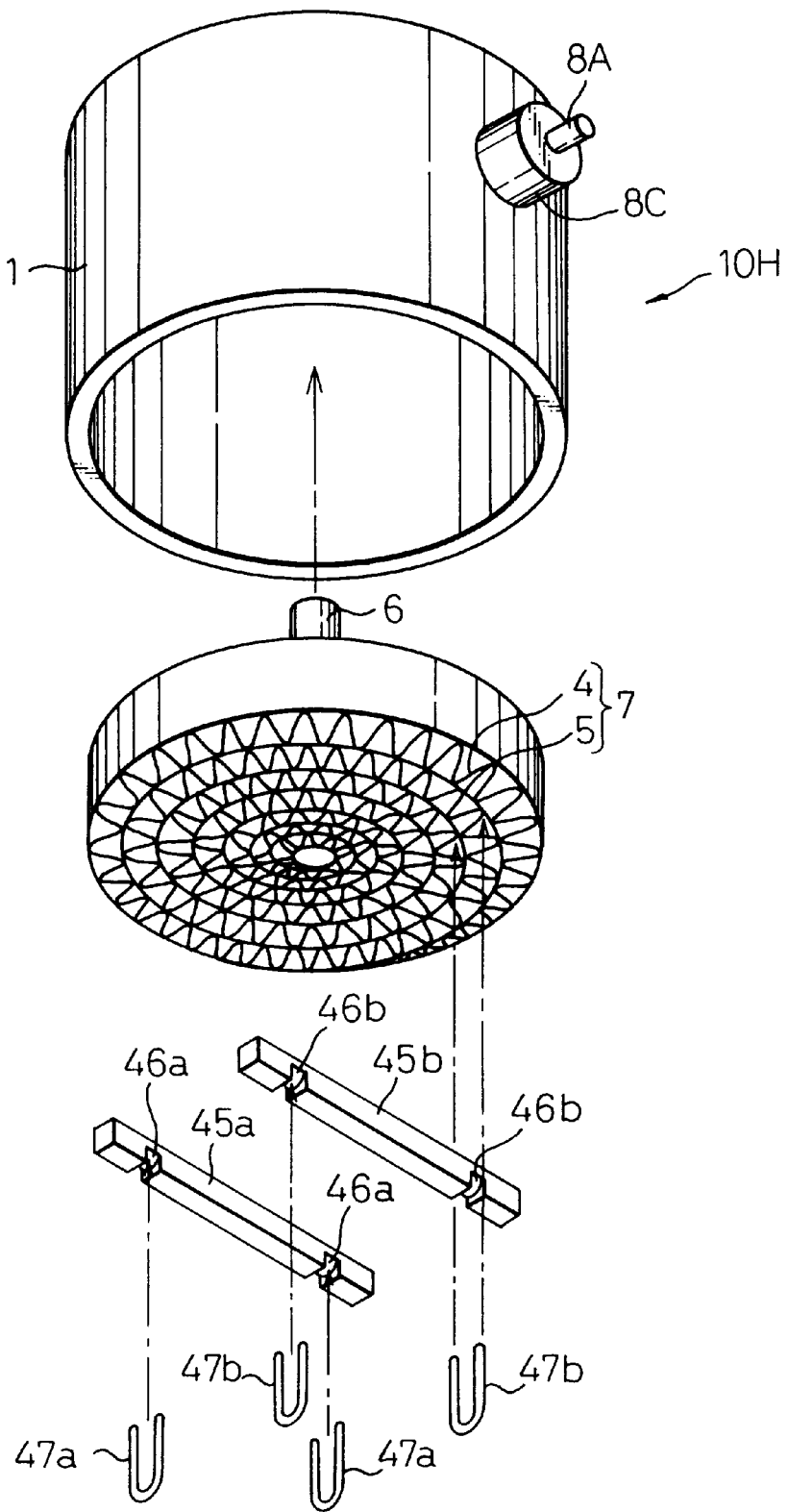
FIG. 18 is an assembly perspective view for explaining the assembly of the electrically heated device composing the exhaust gas purifying device shown in FIG. 17.

FIG. 18 is a view showing the detailed structure of the electrically heated catalyst device 10H including the honeycomb body 7, into which the central electrode 6 is incorporated, the electrode section 8A, the holder 8C and the external cylinder 1.

In this example, on an end surface of the honeycomb body 7 on the downstream side of exhaust gas (the exhaust gas downstream side), there are provided ceramic bars 45a, 45b, which are insulating retainers, in such a manner that the ceramic bars 45a, 45b cross the honeycomb body 7. The ceramic bars 45a, 45b are attached onto the end surface of the honeycomb body 7 on the downstream side of exhaust gas when both end portions of U-shaped pins 47a, 47b made of heat-resistant metal are inserted into the honeycomb body 7 from the downstream side of exhaust gas. Both end portions of U-shaped pins 47a, 47b inserted into the honeycomb body 7 may be fixed to the honeycomb body 7 by means of soldering.

On the end surfaces of the ceramic bars 45a, 45b on the exhaust gas downstream side attached to the honeycomb body 7 by the pins 47a, 47b, there are formed recesses 46a, 46b at positions where the pins 47a, 47 are located. When the shape of each pin 47a, 47b is a U-shape as illustrated in FIG. 18, the shape of each recess 46a, 46b may be a circumferential surface.

Figure 19:
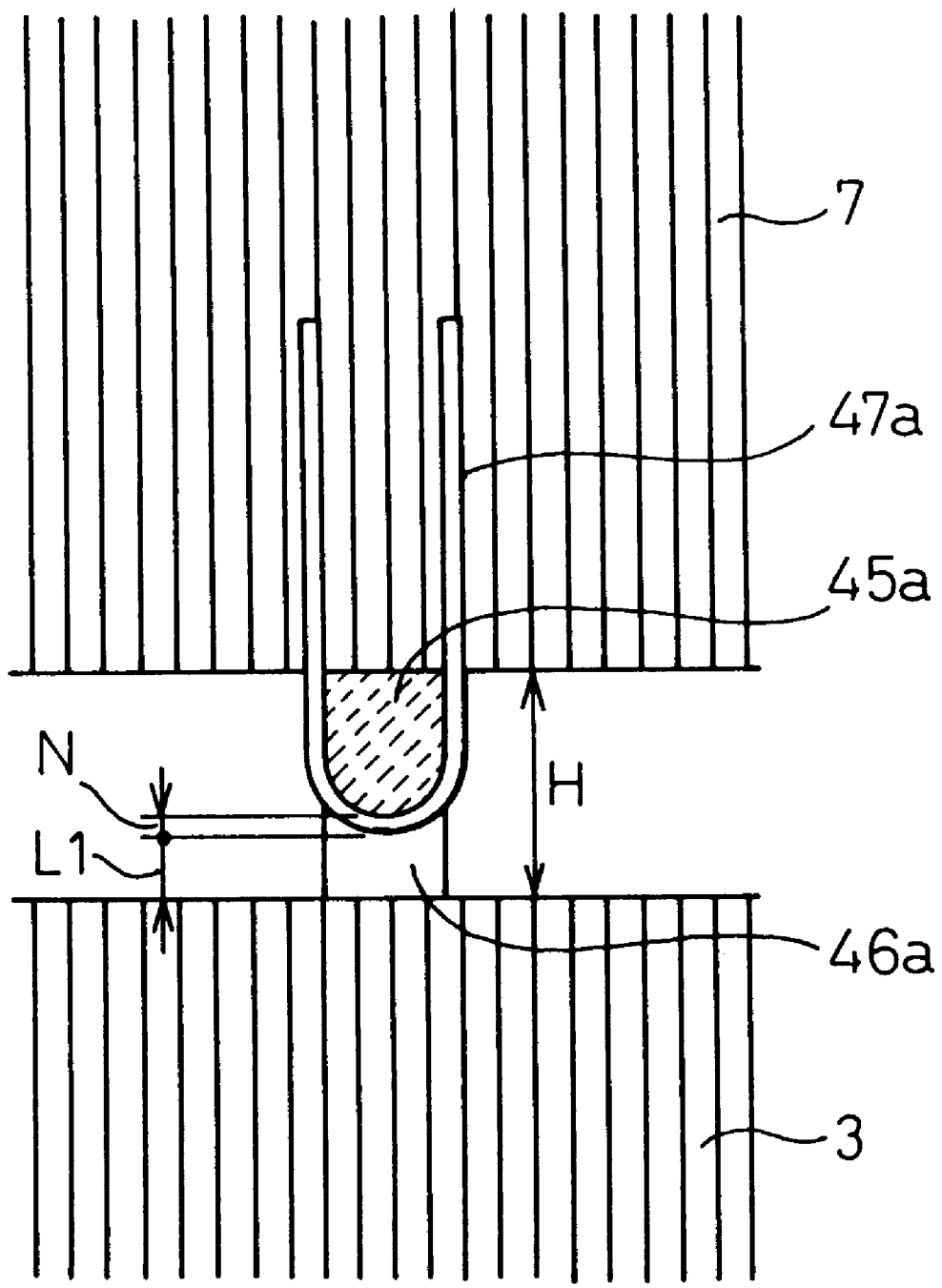
FIG. 19 is a partially enlarged cross-sectional view taken on line VII—VII in FIG. 17.

FIG. 19 is a partially enlarged cross-sectional view taken on line VII—VII in FIG. 17. In FIG. 19, the shape of this recess 46a is explained in detail. As illustrated in FIG. 19, depth Li of the recess 46a of the ceramic bar 45a formed at an attaching position of the pins 47a is determined to be a value higher than the diameter N of the pin 47a, so that a curved portion of the pin 47a on the exhaust gas downstream side can not protrude from an end surface of the ceramic bar 45a on the exhaust gas downstream side when the U-shaped pin 47a is attached in this recess 46a.

In this connection, the overall length of the ceramic bar 45a is determined so that an external metallic cylinder 48 of the main catalyst device 40A described later can be inserted into a space formed between both end portions of the ceramic bar 45a and the metallic cylinder 1 when the ceramic bar 45a is attached by the pin 47a onto the end surface of the honeycomb body 7 on the exhaust gas downstream side.

In this example, as illustrated in FIG. 17, the outer diameter of the external metallic cylinder 48 of the main catalyst device 40A is the same as the inner diameter of the external metallic cylinder 1 of the electrically heated catalyst device 10H. The height of the external metallic cylinder 48 protruding from an end surface of the main catalyst support 3 of the main catalyst device 40A on the exhaust gas upstream side is lower than the height H of the ceramic bar 45a shown in FIG. 19.

Therefore, the outer circumferential surface of the external cylinder 48 of the main catalyst device 40A is inserted into the inner circumferential surface of the external metallic cylinder 1 of the electrically heated catalyst device 10H in the manner illustrated in FIG. 18, and this main catalyst device 40A is inserted until the main catalyst support 3 comes into contact with the ceramic bars 45a, 45b attached to the end surface of the electrically heated catalyst device 10H on the downstream side of exhaust gas. In this way, the exhaust gas purifying device illustrated in FIG. 17 can be composed. In the above condition, the honeycomb body 7 of the electrically heated catalyst device 10H and the main catalyst support 3 of the main catalyst device 40A are electrically insulated from each other.

In the thus composed exhaust gas purifying device 60A including the electrically heated catalyst device 10H and the main catalyst device 40A, it is possible to make the main catalyst support 3 of the main catalyst device 40A approach the honeycomb body 7 of the electrically heated catalyst device 10H. Therefore, the warm-up property of the main catalyst support 4 of the main catalyst device 40A can be enhanced. Since forces given to the ceramic bars 45a, 45b in the direction of the exhaust gas flow are received by the main catalyst support 3 of the main catalyst device 40A, the pins 47a, 47b used for attaching the ceramic bars 45a, 45b to the honeycomb body 7 only function as members to prevent the lateral shift of the ceramic bars 45a, 45b. Accordingly, the diameter of the pins can be reduced. As a result, it is possible to reduce the heat capacities of the pins 47a, 47b. For this reason, there is no possibility that the warm-up property of the main catalyst support 3 is deteriorated.

Figure 20:
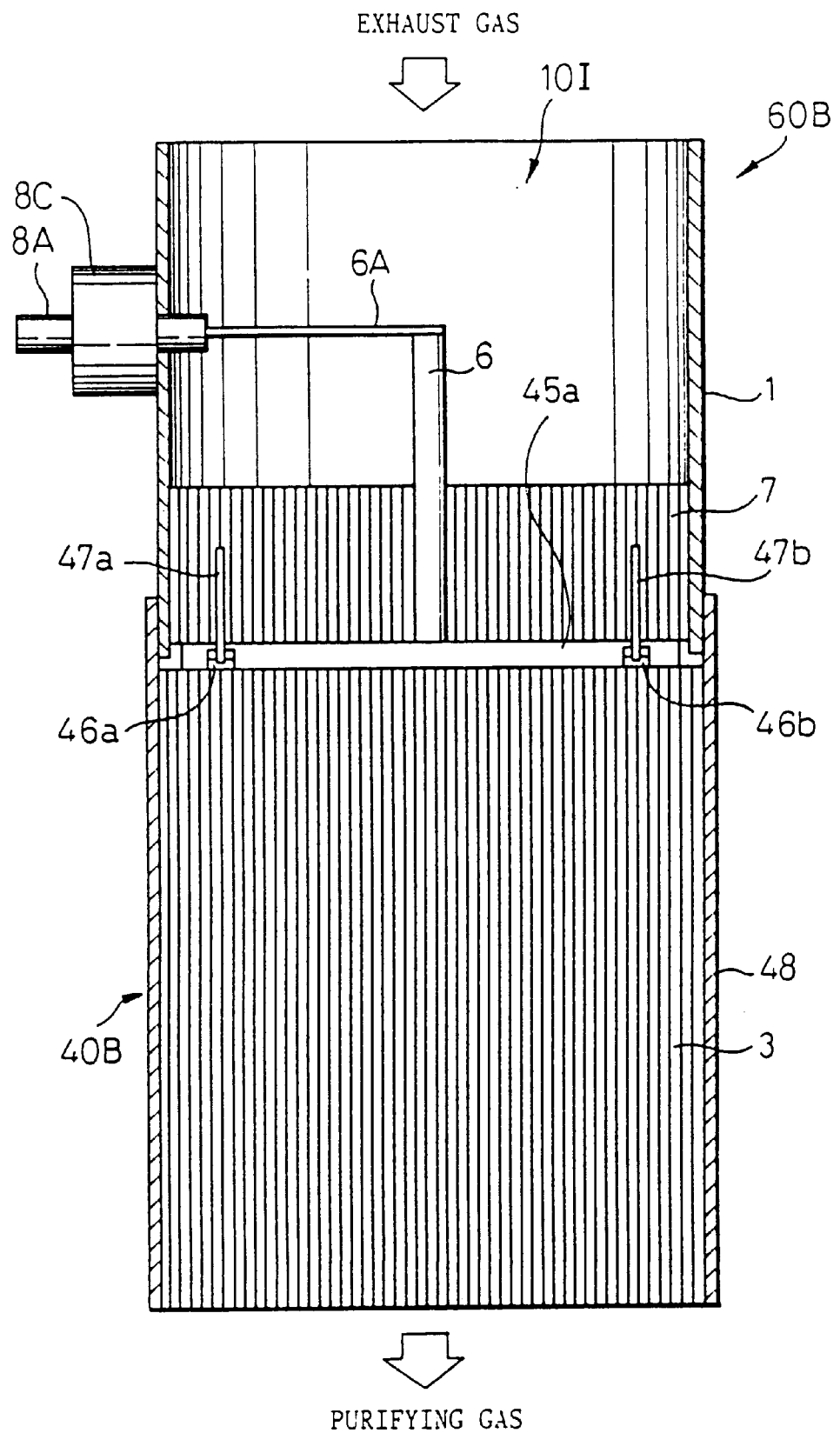
FIG. 20 is a cross-sectional front view of the exhaust gas purifying device of still another example of the present invention.

FIG. 20 is a cross-sectional front view showing an arrangement of the exhaust gas purifying device 60B which is a variation of the exhaust purification device 60A of the example shown in FIG. 17. The arrangement of the exhaust gas purifying device 60B of the variation is substantially the same as that of the exhaust gas purifying device 60A of the example shown in FIG. 17. Accordingly, like reference characters are used to indicate like parts of the exhaust gas purifying device 60A of the example shown in FIG. 17, and the same explanations are omitted here and only the explanations of different parts are made here.

In the exhaust gas purifying device 60B illustrated in FIG. 20, the inner diameter of the external metallic cylinder 48 of the main catalyst device 40B is the same as the outer diameter of the external metallic cylinder 1 of the electrically heated catalyst device 10I. The height of the external cylinder 1 protruding from the end surface of the honeycomb body 7 of the electrically heated catalyst device 10I on the downstream side of exhaust gas is lower than the height H of the ceramic bar 45a shown in FIG. 19.

Therefore, the inner circumferential surface of the external metallic cylinder 48 of the main catalyst device 40B is inserted onto the outer circumferential surface of the external metallic cylinder 1 of the electrically heated catalyst device 10I assembled in the manner shown in FIG. 18. The main catalyst support 3 of the main catalyst device 40B is inserted until it comes into contact with the ceramic bars 45a, 45b attached onto the end surface of the electrically heated catalyst 10I on the downstream side of exhaust gas. In this way, the exhaust gas purifying device 60B illustrated in FIG. 20 can be composed. In the above condition, the honeycomb body 7 of the electrically heated catalyst device 10I and the main catalyst support 3 of the main catalyst device 40B are electrically insulated from each other.

As described above, the exhaust gas purifying device 60B shown in FIG. 20 is different from the exhaust gas purifying device 60A of the example explained with reference to FIGS. 17 to 19, by only one point, which is the way the main catalyst device 40B, is attached to the electrically heated catalyst device 10I, and other points of the exhaust gas purifying device 60B shown in FIG. 20 are the same as those of the exhaust gas purifying device 60A of the example explained with reference to FIGS. 17 to 19.

Figure 21:
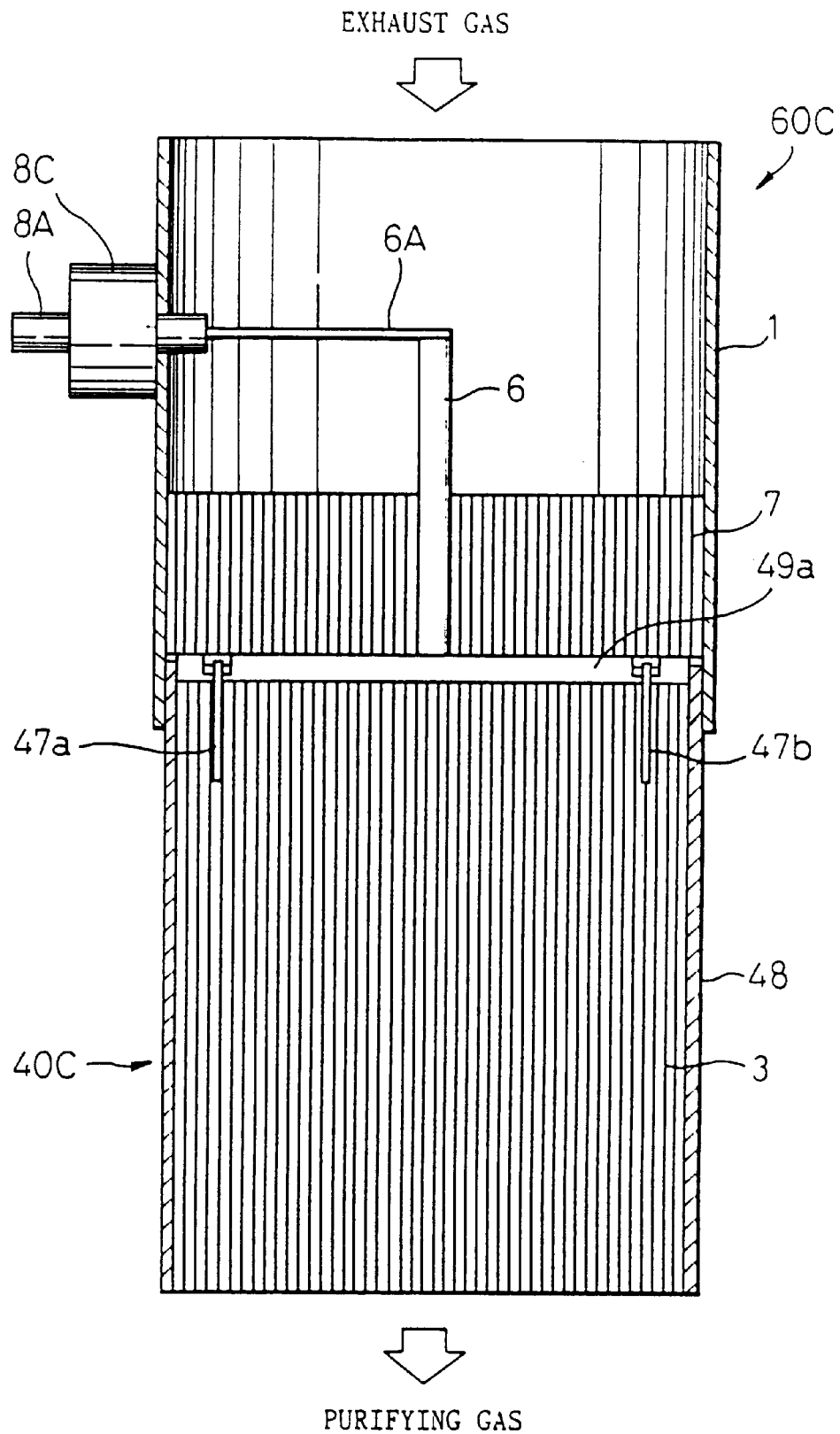
FIG. 21 is a cross-sectional front view of the exhaust gas purifying device of still another example of the present invention.

FIG. 21 is a cross-sectional side view showing an arrangement of the exhaust gas purifying device 60C of the internal combustion engine of another example of the present invention.

In the exhaust gas purifying device 60A of the example shown in FIGS. 17 to 19, the ceramic bars 45a, 45b are attached to the end surface of the honeycomb body 7 of the electrically heated catalyst device 10H on the downstream side of exhaust gas. However, in the exhaust gas purifying device 60C of this example, the ceramic bars 49a are attached onto the end surface of the main catalyst support 3 of the main catalyst device 40C on the upstream side of exhaust gas, by the pins 47a, 47b. Except for the above point, the exhaust gas purifying device 60C of this example is the same as the exhaust gas purifying device 60A of the example shown in FIG. 17.

Figure 22:
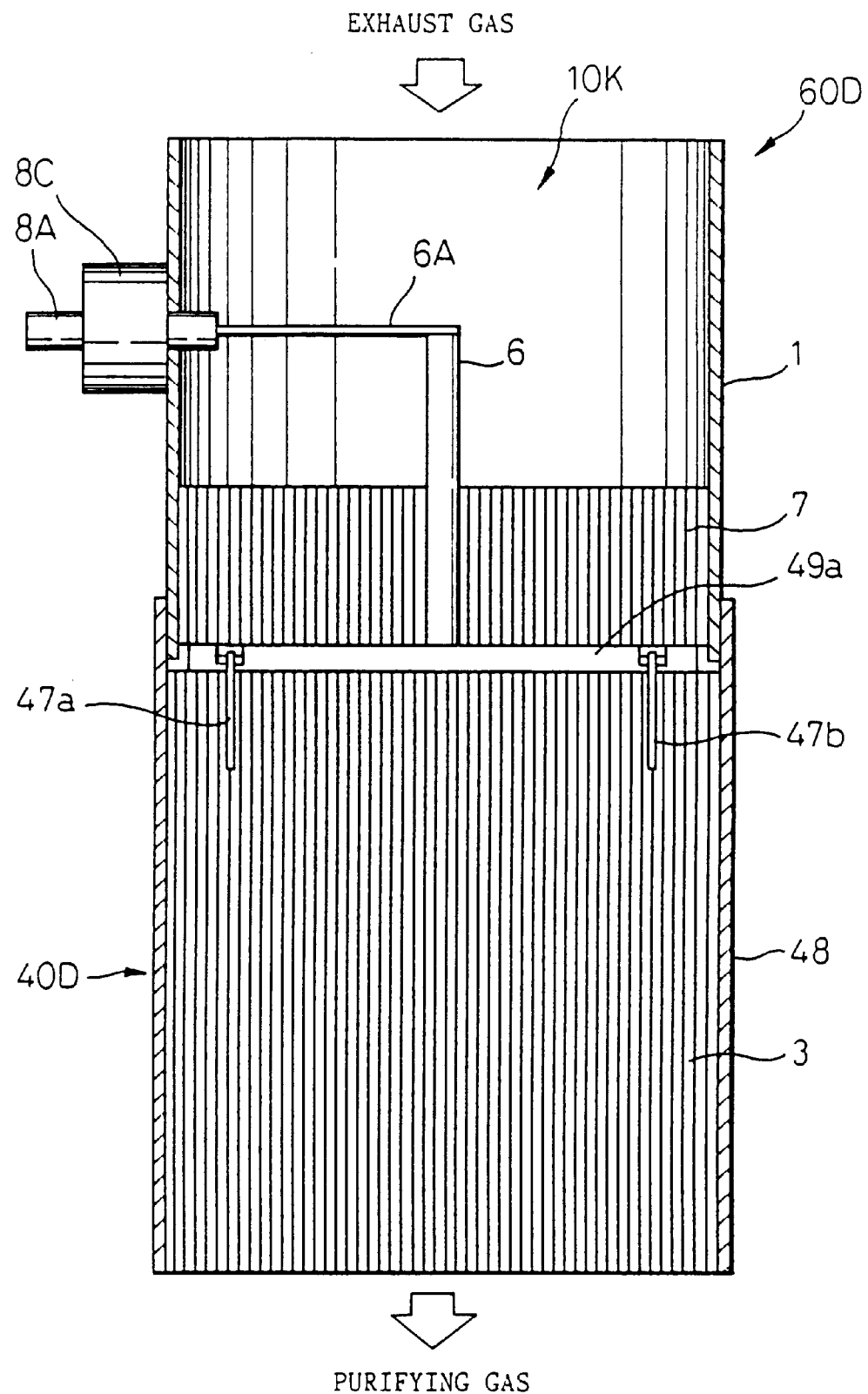
FIG. 22 is a cross-sectional front view of the exhaust gas purifying device of still another example of the present invention.
Figure 23A:
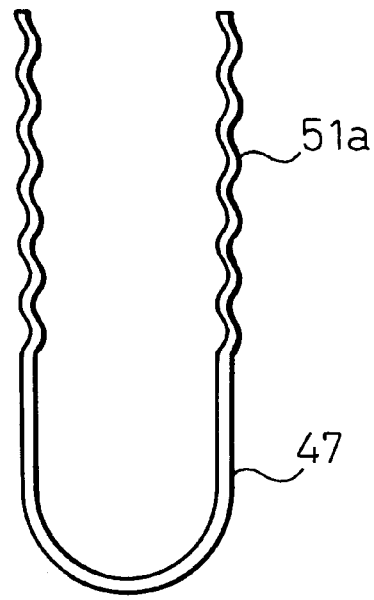
FIGS. 23(a) to 23(d) are views showing examples of the pins used for the exhaust gas purifying devices of the examples shown in FIGS. 17 and 20 to 22.
Figure 23B:
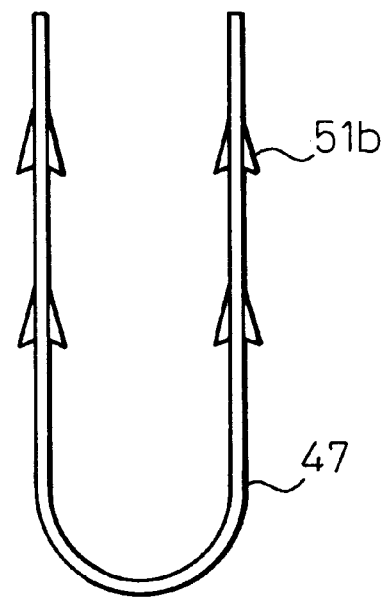
Figure 23C:
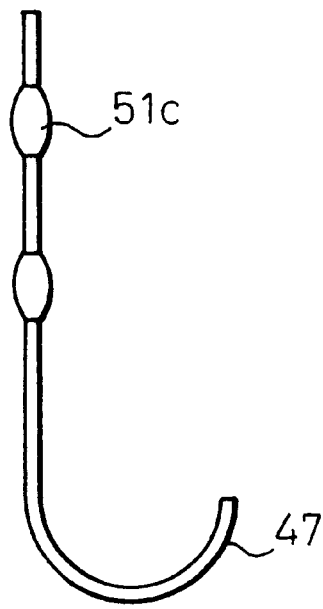
Figure 23D:
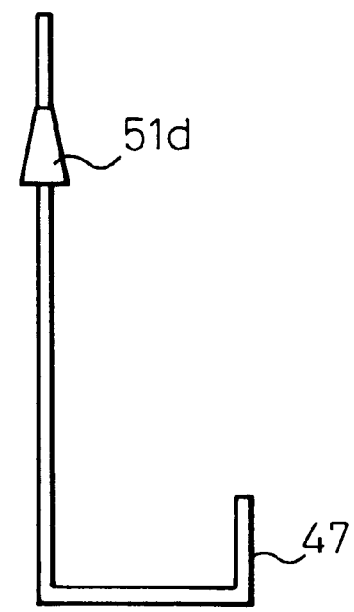

FIG. 22 is an arrangement view showing the exhaust gas purifying device 60D of a variation of the exhaust gas purifying device 60C of the example shown in FIG. 21. In the exhaust gas purifying device 60D shown in FIG. 22, the inner circumferential surface of the external metallic cylinder 48 of the main catalyst device 40D is attached onto the outer circumferential surface of the external metallic cylinder 1 of the electrically heated catalyst device 10K. Other functions are the same as those of the exhaust gas purifying device 60C of the example explained in FIG. 21.

FIGS. 23(a) to 23(d) are views showing variations of the pins 47a, 47b to be used for the exhaust gas purifying devices 60A, 60B, 60C, 60D of the examples explained before. In the pin 47 shown in FIG. 23(a), an attaching portion of the pin 47 to be attached to the honeycomb body 7 or the main catalyst support 3 is formed into a corrugated portion 51a. In the pin 47 shown in FIG. 23(b), arrow-shaped protrusions 51b are formed in the attaching portion of the pin 47. In the pin 47 shown in FIG. 23(c), the shape of the pin is not formed into a U-shape but formed into a J-shape. In this pin 47, two swollen portions 51c are formed in a portion of the attaching section of the pin to be attached to the honeycomb body 7 or the main catalyst support 3. In the pin 47 shown in FIG. 23(d), the shape is not formed into a U-shape but formed into an L-shape. In this case, shapes of the recesses formed in the ceramic bars may be rectangular grooves. In this example, a portion of the attaching section of the pin 47 to be attached to the honeycomb body 7 or the main catalyst support 3 swells into a truncated cone 51d. When the end portion of the pin is formed into the shape described above, it is difficult for the pin 47 to be drawn out from the honeycomb body 7 or the main catalyst support 3 after it has been once inserted. Thus formed pin can be fixed to the sheet of metallic foil by soldering in which only a small amount of solder is used.

Variations of the pin 47 are explained above, however, it should be noted that the shape of the pin 47 is not limited to the above four examples.

Figure 24:
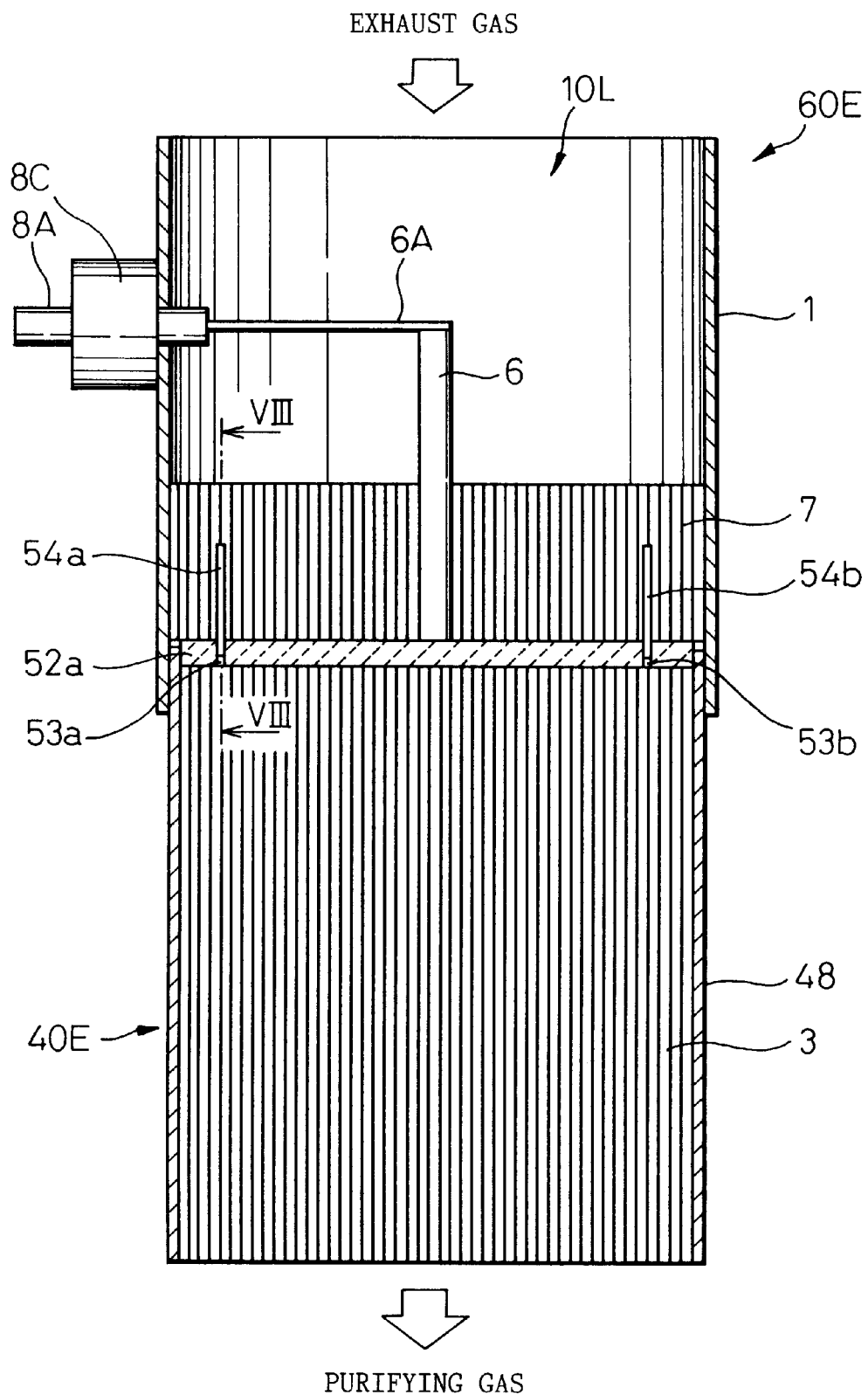
FIG. 24 is a cross-sectional front view of the exhaust gas purifying device on still another example of the present invention.
Figure 25A:
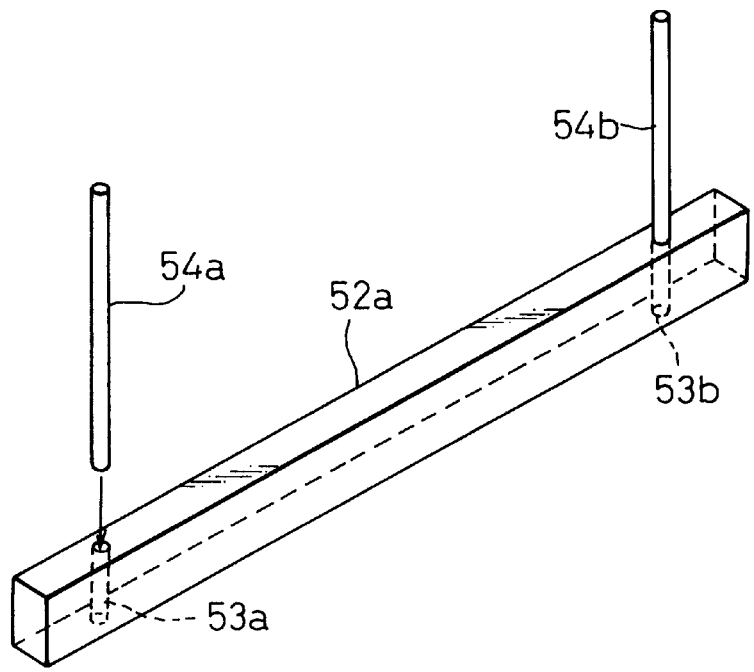
FIG. 25(a) is an assembling perspective view for explaining a state in which the ceramic bar and the pins are attached to each other.

FIG. 24 is a cross-sectional front view showing an arrangement of the exhaust gas purifying device 10E of another example of the present invention. The arrangement of the exhaust gas purifying device 60E of this example is substantially the same as that of the exhaust gas purifying device 60A shown in FIG. 17. Different points are only the shapes of the ceramic bars 52a and the shapes of the pins 54a, 54b. As illustrated in FIG. 25(a), in this example, there are provided through-holes 53a, 53b in the ceramic bar 52a arranged in such a manner that the ceramic bar 52a crosses an end surface of the honeycomb body 7 on the downstream side of exhaust gas. In this example, the pins 54a, 54b are formed into a rod-shape. The inner diameter of the through-hole 53a is a little larger than the outer diameter of the pin 54a, that is, an allowance necessary for heat expansion is made between the inner diameter of the through-hole 53a and the outer diameter of the pin 54a. When the pin 54a is inserted into the honeycomb body 7, the ceramic bar 52a comes into pressure contact with the main catalyst support 3, so that the pin 54a can not be easily drawn out.

A free end portion of the pin 54a inserted into the honeycomb body 7 is fixed to the honeycomb body 7 by means of soldering.

Figure 25B:
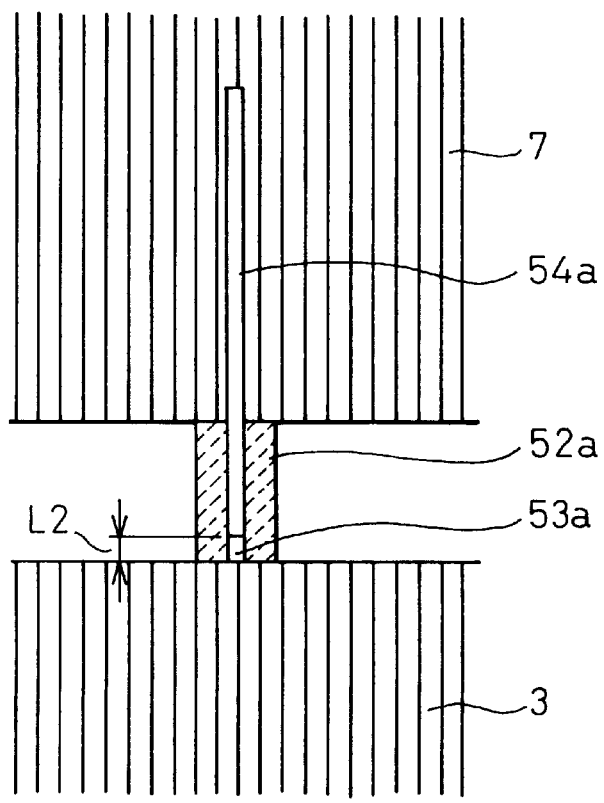
FIG. 25(b) is a partially enlarged cross-sectional view taken on line VIII—VIII in FIG. 24.

FIG. 25(b) is a partially enlarged cross-sectional view taken on line VIII—VIII in FIG. 24. In FIG. 25(b), a relation between the through-hole 53a and the pin 54a is shown when the pin 54a is attached into the through-hole 53a. As illustrated in FIG. 25(b), the pin 54a is inserted into the through-hole 53a formed in the ceramic bar 52a in such a manner that an end of the pin 54a is located at a position distant by a height L2 from an end surface of the ceramic bar 52a on the downstream side of exhaust gas. The pin 54a is inserted into one portion of the through-hole 53a while the pin 54a is not inserted into the other portion of the through-hole 53a corresponding to the height L2. Due to the above arrangement, no end of the pin 54a on the downstream side of exhaust gas protrudes from an end surface of the ceramic bar 52a on the downstream side of exhaust gas.

Other arrangements of the exhaust gas purifying device 60E are the same as those of the exhaust gas purifying device 60A of the example shown in FIG. 17. Accordingly, even in the exhaust gas purifying device 60E of the example assembled in the manner illustrated in FIG. 24, it is possible to make the main catalyst support 3 of the main catalyst device 40E approach the honeycomb body 7 under the condition of electrical insulation. Therefore, the warm-up property of the main catalyst support 3 of the main catalyst device 40E can be enhanced. The pins 54a, 54b holding the ceramic bars 52a, 52b are formed into a rod-shape. Therefore, it is possible to reduce the heat capacities of the pins 54a, 54b. Accordingly, the warm-up property of the main catalyst support 3 is not deteriorated.

Although not shown in the drawing, it is possible to adopt the following arrangement of the exhaust gas purifying device 60E. In the exhaust gas purifying device 60E, the inner diameter of the external cylinder 48 of the main catalyst device 40E is formed to be the same as the outer diameter of the external metallic cylinder 1 of the electrically heated catalyst device 10L, and the inner circumferential surface of the external metallic cylinder 48 of the main catalyst device 40E is inserted onto the outer circumferential surface of the external metallic cylinder 1 of the electrically heated catalyst device 10L.

Figure 26:
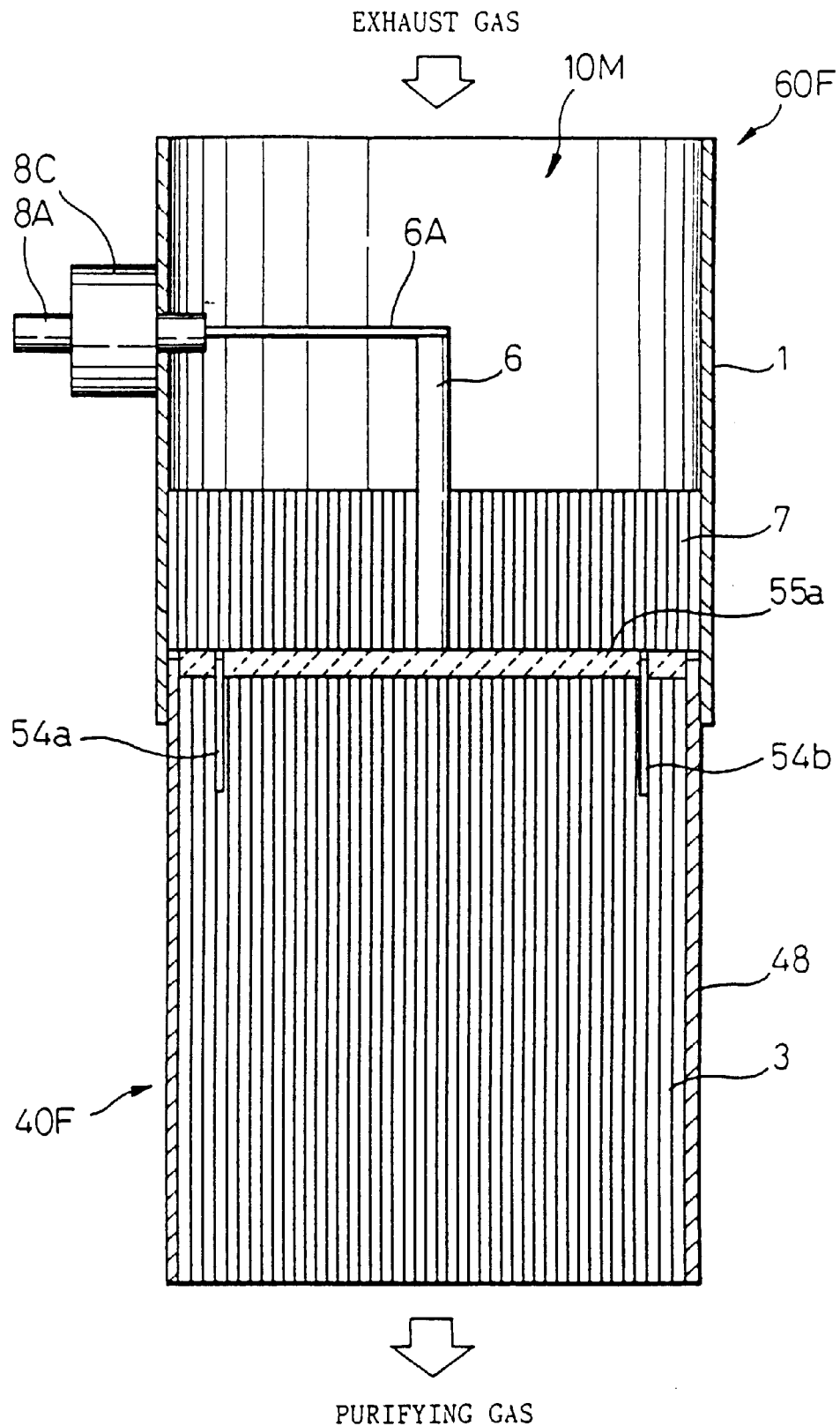
FIG. 26 is a cross-sectional front view of the exhaust gas purifying device of still another example of the present invention.
Figure 27A:
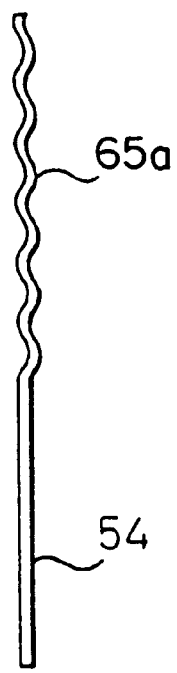
FIGS. 27(a) to 27(d) are views showing examples of the pins used for the exhaust gas purifying device shown in FIGS. 24 and 26.
Figure 27B:
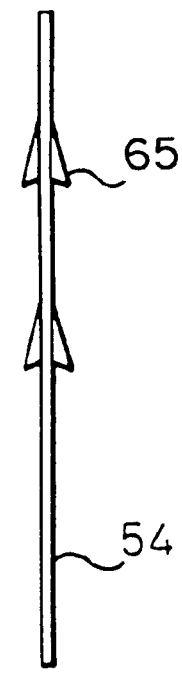
Figure 27C:
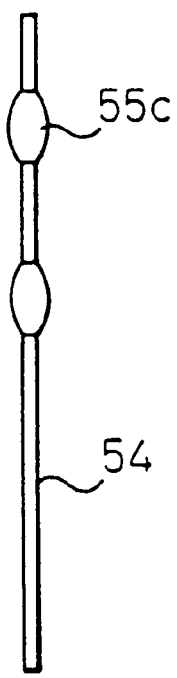
Figure 27D:
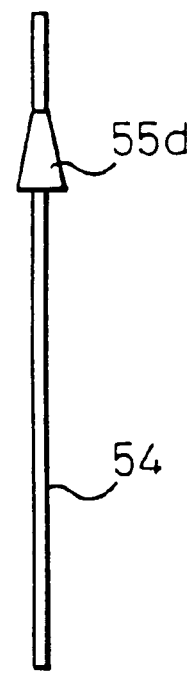

FIG. 26 is a cross-sectional side view showing an arrangement of the exhaust gas purifying device 60F of another example of the present invention.

In the exhaust gas purifying device 60F of this example, the ceramic bars 55a are attached by the pins 54a, 54b onto an end surface of the main catalyst support 3 of the main catalyst device 40F on the upstream side of exhaust gas. Other arrangements are the same as those of the exhaust gas purifying device 60E of the example illustrated in FIG. 24.

Although not shown in the drawing, it is possible to adopt the following arrangement of the exhaust gas purifying device 60F. In the exhaust gas purifying device 60F, the inner diameter of the external cylinder 48 of the main catalyst device 40F is formed to be the same as the outer diameter of the external metallic cylinder 1 of the electrically heated catalyst device 10M, and the inner circumferential surface of the external metallic cylinder 48 of the main catalyst device 40F is inserted onto the outer circumferential surface of the external metallic cylinder 1 of the electrically heated catalyst device 10M.

FIGS. 27(a) to 27(d) are views showing variations of the pin 54 to be used for the exhaust gas purifying devices 10L, 10M of the examples explained before. In the fixing pin 54 shown in FIG. 27(a), an attaching portion of the pin 54 to be attached to the honeycomb body 7 or the main catalyst support 3 is formed into a corrugated portion 65a. In the pin 54 shown in FIG. 27(b), arrow-shaped protrusions 65 are formed in the attaching portion of the pin 54. In the pin 54 shown in FIG. 27(c), two swelling portions 55c are formed in a portion of the attaching section of the pin to be attached to the honeycomb body 7 or the main catalyst support 3. In the pin 54 shown in FIG. 27(d), the shape is not formed into a U-shape but formed into an L-shape. In this case, a portion of the attaching section of the pin 54 to be attached to the honeycomb body 7 or the main catalyst support 3 is swollen into a truncated cone 55d. When the end portion of the pin is formed into the shape described above, it is difficult for the pin 54 to be drawn out from the honeycomb body 7 or the main catalyst support 3 after it has been once inserted. The thus formed pin can be fixed to the sheet of metallic foil by soldering in which only a small amount of solder is used.

Figure 28:
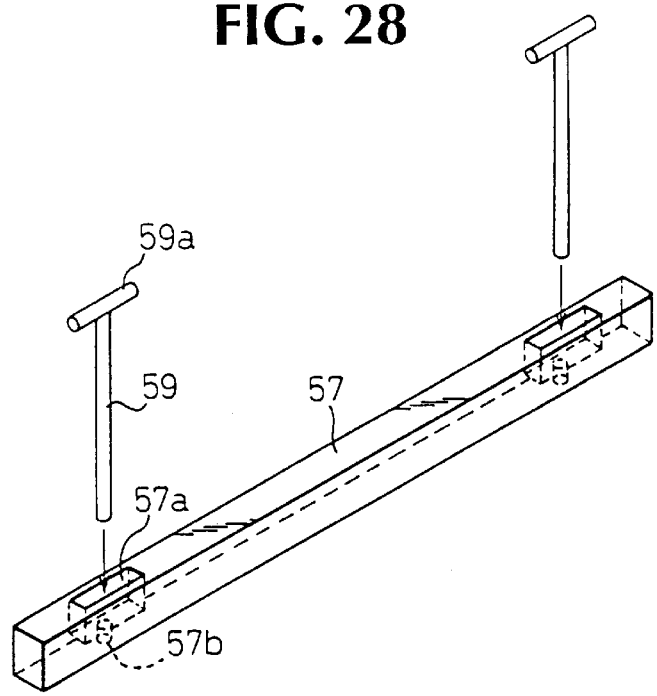
FIG. 28 is an assembling perspective view showing still another example of the ceramic bar and the pins used for the exhaust gas purifying device shown in FIGS. 24 and 26.

FIG. 28 is an assembly perspective view showing still another example of the ceramic bar 57 and the pins 59 to be used in the exhaust gas purifying devices 60E, 60F. In this example, there is provided a rectangular hole 57a on one side of the through-hole 57b formed in the ceramic bar 57. On one end of the rod-shaped pin 59, there is provided a lateral member 59a to be accommodated in this rectangular hole 57a. The overall shape of the pin 59 is formed into a T-shape. In this arrangement, it is necessary for the depth of the rectangular hole 57a to be larger than the diameter of the lateral member 59a of the pin 59, so that the lateral member 59a of the pin 59 can not protrude from the surface of the ceramic bar 57 when the lateral member 59a of the pin 59 is accommodated in the hole 57a.

Variations of the pins 47, 54, 59 are explained above, however, it should be noted that the shapes of pins are not limited to the above specific examples.

In the aforementioned exhaust gas purifying device, a clearance between the end surface of the electrically heated catalyst support on the downstream side of exhaust gas and the end surface of the main catalyst support on the upstream side of exhaust gas is set at 1 mm to 50 mm. It is very effective that the clearance is set at 5 mm to 50 mm.

That is, in order to prevent a contact of the electrically heated catalyst support with the honeycomb body of the main catalyst support caused by a thermal expansion or a minute slippage so as to ensure the electric insulation for positively heating the electrically heated catalyst support, it is necessary to provide a clearance of at least 1 mm. When the clearance is set at a value not less than 5 mm, the warm-up property of the entire main catalyst can be enhanced when exhaust gas is stirred between the electrically heated catalyst support and the main catalyst support.

The value of 50 mm is an upper limit of the clearance by which the warm-up property of the main catalyst warmed up by the exhaust gas heated by the electrically heated catalyst support is not deteriorated.

In this connection, in the example explained above, the electrically heated catalyst device accommodates a honeycomb body 7 in which a sheet of laminated metallic foil composed of the corrugated foil 4 and the flat foil 5 is spirally wound. However, it is possible to form the honeycomb body 7 without spirally winding the sheet of laminated metallic foil. Also, it is possible to form the honeycomb body 7 by bending the sheet of laminated metallic foil zigzag so that it can be formed into a columnar shape. Even to the electrically heated catalyst device in which the above types of honeycomb bodies are accommodated, the ceramic bar and the ring-shaped holding member or the pin of the present invention can be effectively applied.

Figure 31A:
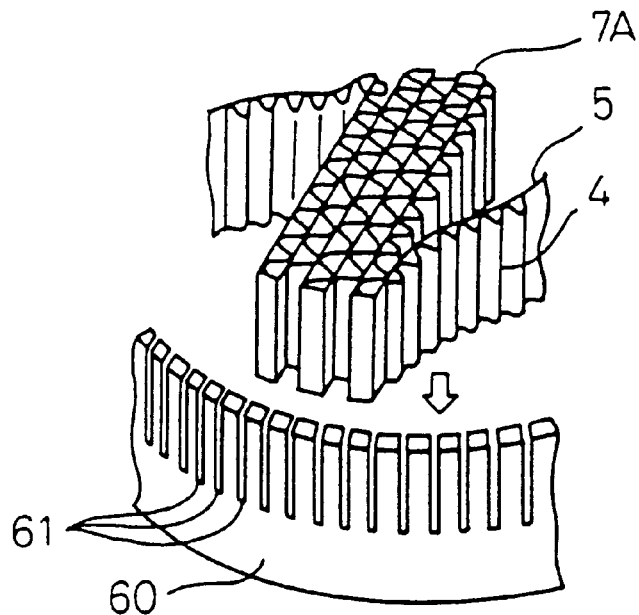
FIG. 31(a) is a partially perspective view for explaining a method of forming another well known honeycomb body.
Figure 31B:
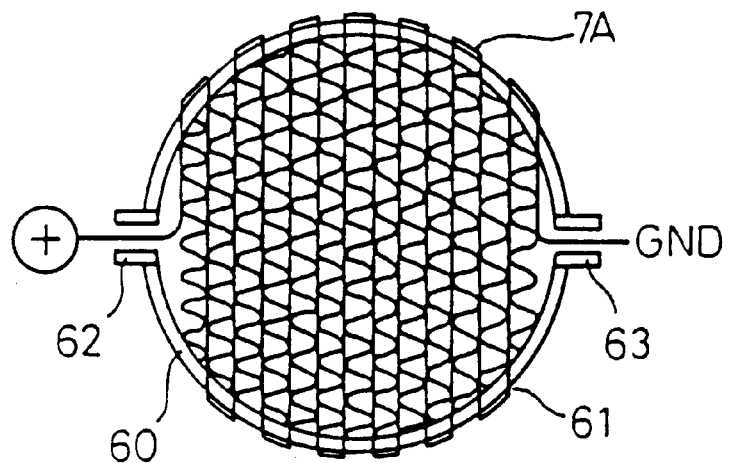
FIG. 31(b) is a plan view showing an outline of the end face of the honeycomb body formed by the forming method shown in FIG. 31(a).
Figure 32:
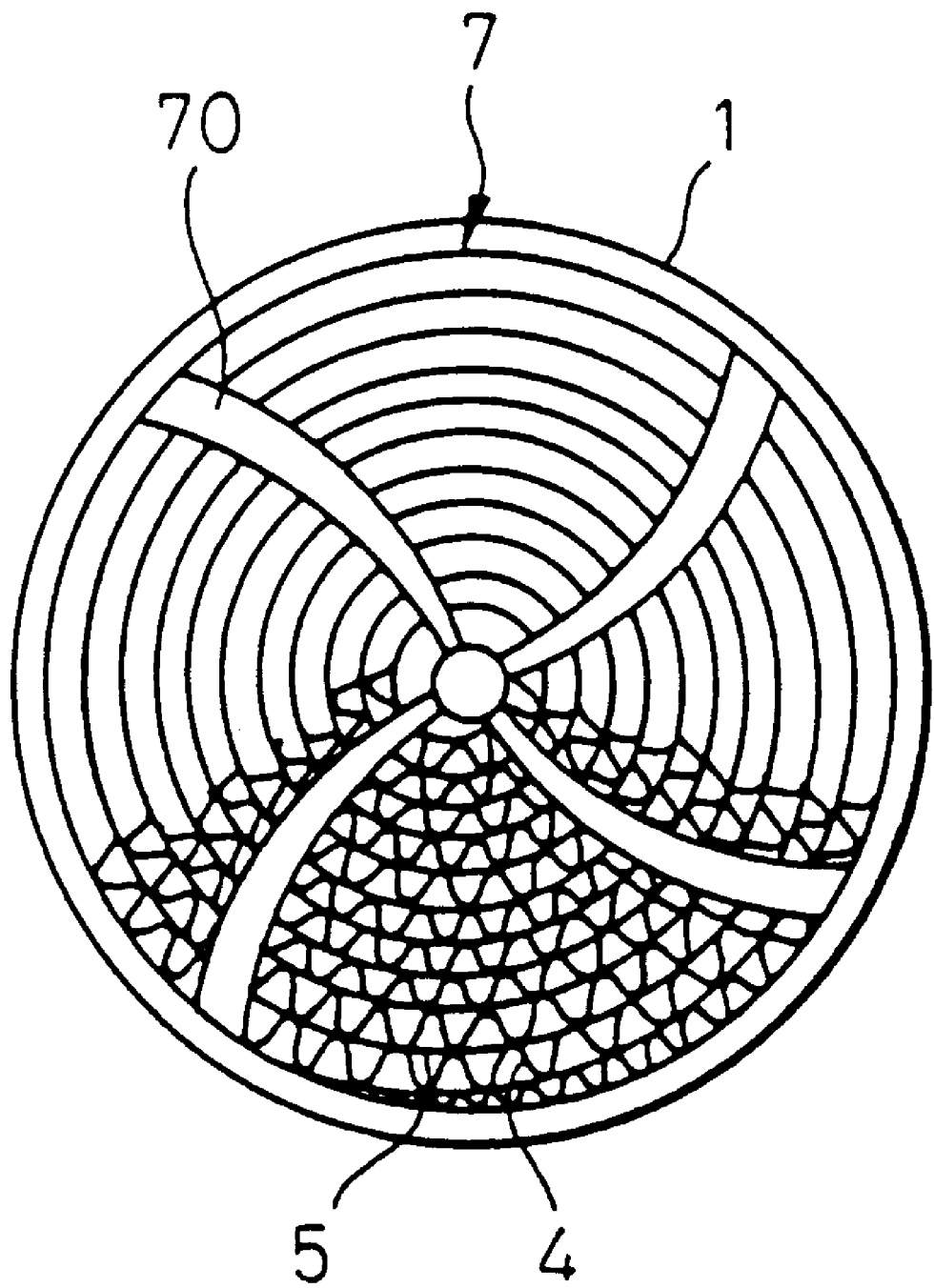
FIG. 32 is a bottom view of the electrically heated catalyst device showing an example of the structure of holding a honeycomb body of a well-known catalyst support.

An example of the honeycomb body composed of a zigzag-shaped sheet of laminated metallic foil is explained as follows. As illustrated in FIGS. 31(a) and 31(b), the corrugated foil 4 and the flat foil 5 are put on each other to form a strip-shaped sheet of metallic foil 7A. This strip-shaped sheet of metallic foil 7A is folded and laminated so as to make a laminated body. This laminated body is charged into a slit holder 60 having slits 61. Folding points of the strip-shaped body are inserted into the above slits so as to form a honeycomb body. The thus formed honeycomb body is inserted into an external metallic cylinder. An electricity introducing section is composed in such a manner that a lead is arranged in the holes 62, 63 formed in the slit holder, and one end of this lead is connected to both ends of the strip-shaped body 7A and the other end of this lead is connected to a battery located outside the exhaust gas purifying device.

As explained above, according to the present invention, the support member of the honeycomb body is made of electrically insulating ceramic bars. Accordingly, when electricity is supplied in the honeycomb body, an electric current flows in the electric current passage of the honeycomb body without flowing to the ceramic bars. Consequently, there is no possibility that the generation of heat in the electric current passage is deteriorated.

Although the ceramic bars come into contact with the honeycomb body, the ceramic bars are fixed to the reinforcing layer of the honeycomb body by the pins, or alternatively the ceramic bars are only held by the ring-shaped holding member joined to the external metallic cylinder. That is, the ceramic bars are not joined to the external metallic cylinder, the honeycomb body or the electrode. As a result, a honeycomb body holding structure, which is flexible with respect to thermal expansion, can be formed. Therefore, the exhaust gas purifying device is not damaged by the influence of thermal expansion.

As described above, telescoping and damage in the honeycomb body can be positively prevented, and the durability of the electrically heated metallic catalyst support can be enhanced. Therefore, it is possible to maintain the function stably over a long period of time.

In the present invention, there is provided a reinforcing layer which is formed in the honeycomb body for the purpose of arranging the ceramic bars. This reinforcing layer is composed of an inner circumference reinforcing layer and an outer circumference reinforcing layer, or alternatively this reinforcing layer is only composed of an outer circumference reinforcing layer. In this case, this reinforcing layer may be composed intermittently.

It is preferable that the ceramic bar is made of material, the heat-resistant strength of which is high, the heat-resistant impact property of which is excellent, and the anti-oxidizing property of which is also excellent in a temperature region lower than 1000° C., for example, the ceramic bar is preferably made of ceramics of oxides, the principal component of which is silicon nitride or alumina.

Concerning the shape of the ceramic bar, it is preferable that at least a supporting portion of the honeycomb body is formed into a thin rod shape. Alternatively, a plurality of rod-shaped bodies may be integrated into one body. When a plurality of ceramic bars described above are arranged in a well balanced condition, telescoping of the honeycomb body can be stably and reliably prevented.

Concerning the holding means of these ceramic bars, on the inner circumference reinforcing layer side, the ceramic bars may be fixed onto the inner circumference reinforcing layer by pins, or alternatively the ceramic bars may be joined to the central electrode section. When the ceramic bars are fixed onto the outer circumference reinforcing layer, pins are preferably used for the fixation from the viewpoint of absorbing a difference in thermal expansion.

Concerning the pins to fix the ceramic bars to the honeycomb body, an insulating property is not necessarily required. However, in the same manner as that of the insulating ceramic bars, it is preferable that the pins are made of material, the heat-resistant strength of which is high in a temperature region lower than 1000° C., and the anti-oxidization property of which is excellent, for example, it is preferable that the pins are made of stainless steel of Fe—Cr group, stainless steel of Fe—Cr—Al group, stainless steel of Fe—Cr—Ni—Al group, or inconel.

Shapes of the ceramic bars are not limited to a specific example, but any shape may be adopted as long as the ceramic bars are capable of engaging with the honeycomb body. Therefore, commonly used pin shapes such as a U-shape, a T-shape and a shape having no head portion shown in the above examples may function properly. An end portion of the pin is inserted into the reinforcing layers formed on the inner circumference and the outer circumference of the honeycomb body. Then the end portion of the pin is joined by means of soldering. From the viewpoint of preventing damage caused by a difference in the thermal expansion between the ceramic bar and the honeycomb body, the ceramic bar is not joined to the pin.

In the case of using a U-shaped pin, when there is a possibility that the ceramic bar is drawn out, it is effective to provide an engaging groove in the ceramic bar so that the ceramic bar can be stably held by the engaging groove.

When an end portion of the ceramic bar is held by the ring-shaped holding member, from the viewpoint of joining the holding member to the external metallic cylinder easily, it is preferable that the holding member is made of material which can be easily welded or soldered to the external metallic cylinder.

It is preferable that an engaging groove is formed in at least one of the ring-shaped holding member and the ceramic bar, so that the end portion of the ceramic bar cannot be shifted or drawn out. This ring-shaped holding member is formed into a ring shape or a shape similar to it, or alternatively this ring-shaped holding member is formed into a shape in which only the end portion of the ceramic bar can be held.

EXAMPLE

An electrically heated catalyst device, in which the electrically heated metallic catalyst support shown in FIG. 11(c) of the present invention was used, was attached to a position immediately below an exhaust manifold of an internal combustion engine, the engine displacement of which was 2000 cc. A heat cycle test was then carried out at an exhaust gas temperature of 100 to 900° C., and the durability of the structure of the honeycomb body was tested and also a heating test in which electricity was turned on was conducted before and after the heat cycle test.

According to the example of the present invention, no telescoping was caused in the honeycomb body, and no damage was seen in the metallic foil and the local joining portion forming the electric current passage. According to the conventional example, telescoping occurred in the honeycomb body and the metallic foil was damaged at the completion of 100 heat cycles, and the heating function to be accomplished by supplying electricity was lost.

Figure 13B:
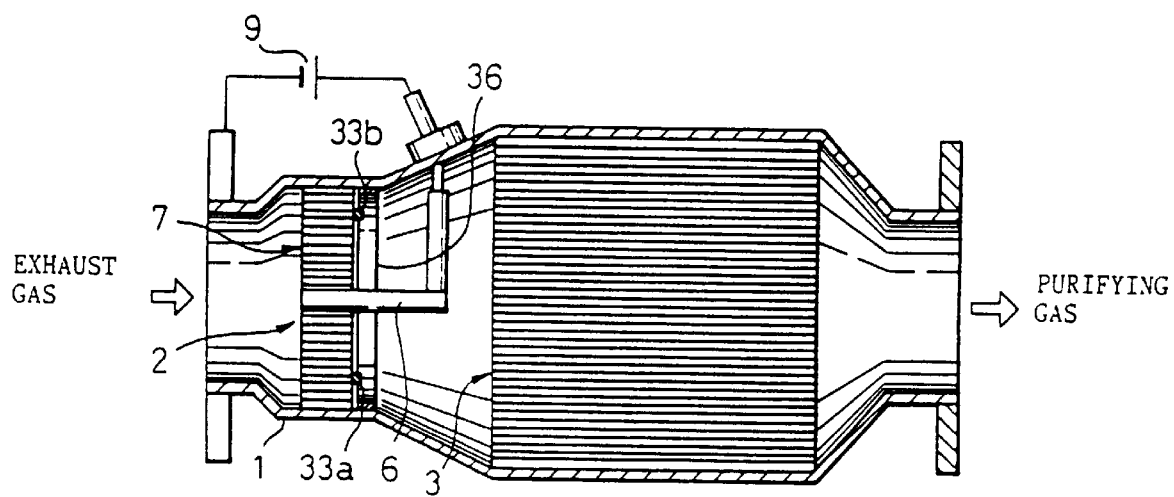
FIG. 13(b) is a cross-sectional front view of the exhaust gas purifying device of still another example of the present invention.

In this example, the ceramic bars were arranged as shown in FIG. 13(b) so as to support the honeycomb body. In this example, the ceramic bars were made of a ceramic of silicon nitride, and the section of each ceramic bar of examples was 1.5 to 3 mm square. The ring-shaped holding member was made of stainless steel of ferrite, and the thickness was 1.5 mm. This ring-shaped holding member was welded to the external metallic cylinder. In the conventional example shown here, there no ceramic bars were provided.

Executing Conditions
(These conditions were common among the example of the invention and the conventional example.)
Honeycomb body (Electrically heated catalyst support)
Outer diameter: 90 mm
Central electrode (made of ferritic stainless steel)
Diameter: 8 mm
Corrugated foil (made of ferritic stainless steel)
Width; 20 mm
Thickness: 0.05 mm
Wave height: 1.25 mm
Wave pitch: 2.5 mm
Flat foil (made of ferritic stainless steel)
Width: 20 mm
Thickness: 0.05 mm
External cylinder (casing)
Material: ferritic stainless steel
Thickness: 1.5 mm
Inner diameter: 90 mm
Industrial Possibility In the present invention, the honeycomb body supporting member is formed from an electrically insulated ceramic bar. Therefore, when electricity is supplied in the honeycomb body, no electric current flows to the ceramic bar, so that the generation of heat in the electric current passage of the honeycomb body is not obstructed.

The ceramic bar is held by the reinforcing layer formed in the honeycomb body. Although the ceramic bar comes into contact with the honeycomb body, it is held by the outer circumferential layer of the honeycomb body, and further it is held by the reinforcing layer, if necessary. Alternatively, the ceramic bar is held by the ring-shaped holding member which is joined to the external metallic cylinder. That is, the ceramic bar is not joined to the external metallic cylinder, the honeycomb body and the electrode. Accordingly, it is possible to compose a honeycomb body holding structure flexible with respect to thermal expansion. There is no possibility that the thus composed honeycomb body holding structure is damaged by the influence of a difference of thermal expansion.

As described above, according to the present invention, telescoping of the honeycomb body can be positively prevented, and the durability of the electrically heated catalyst support can be enhanced, so that the function of the catalyst support can be stably maintained over a long period of time. Accordingly, the utility value of the present invention is great in the industry.

We claim:

1. A device for purifying exhaust gas of an internal combustion engine comprising:
   an electrically heated catalyst device having a columnar honeycomb body formed from a sheet of flat metallic foil disposed on a sheet of corrugated metal foil;
   said columnar honeycomb body forming a catalyst support having a cylindrical shape with said catalyst support having an outer circumferential portion and said catalyst support further having an upstream end face for location upstream in an exhaust gas flow and a downstream end face for location downstream in the exhaust gas flow;
   an external metallic cylinder surrounding said catalyst support;
   an electric current passage provided in at least a portion of said catalyst support for generating heat by supplying electricity to said catalyst support;
   a plurality of electrically insulating ceramic bars arranged on the downstream end face of said catalyst support, with each of said ceramic bars having a first end portion and an opposed second end portion;
   at least one end portion of each ceramic bar being supported by a holding member located at said outer circumferential portion, said holding member being one of a ring-shaped holding member and a pin, each ceramic bar not joined to the external metallic cylinder.

2. A device for purifying exhaust gas according to claim 1, wherein the plurality of ceramic bars are arranged symmetrically with respect to a center of the downstream end face of the catalyst support and also arranged in such a manner that said ceramic bars pass between the center of the downstream end face and the external metallic cylinder.

3. A device for purifying exhaust gas according to claim 1, wherein the plurality of ceramic bars are arranged on the downstream end face of the catalyst support radially with respect to a center of the downstream end face.

4. A device for purifying exhaust gas according to claim 1, wherein both end portions of the ceramic bars are held by the ring-shaped holding member joined to the external metallic cylinder.

5. A device for purifying exhaust gas according to claim 4, wherein a holding section of the ring-shaped holding member is formed to a cylindrical shape protruding to the inside of the ring-shaped holding member.

6. A device for purifying exhaust gas according to claim 4, wherein a holding section of the ring-shaped holding member is formed to a gutter-shape protruding into the inside of the ring-shaped holding member.

7. A device for purifying exhaust gas according to claim 4, wherein said ring-shaped holding member has an exhaust gas entry side end portion and a flange section is formed on the entire circumference of the exhaust gas entry side end portion of the ring shaped holding member by bending the exhaust gas entry side end portion of the ring-shaped holding member toward inside of the holding member, and the flange section is recessed to form a gutter-shaped holding section.

8. A device for purifying exhaust gas according to claim 4, wherein the ring-shaped holding member has a holding section and the holding section of the ring-shaped holding member is composed of a cylindrical member protruding toward inside of the ring-shaped holding member, and an elastic member is put on the cylindrical holding section.

9. A device for purifying exhaust gas according to claim 4, wherein the ring-shaped holding member has a holding section and the holding section of the ring-shaped holding member is composed of a gutter-shaped member formed inside the ring-shaped holding member, and an elastic member is put on the gutter-shaped member.

10. A device for purifying exhaust gas according to claim 4, wherein the ring-shaped holding member has a cylindrical or a gutter shaped holding section and the cylindrical or the gutter-shaped holding section protrudes toward inside of the ring-shaped holding member and includes an elastic member having an inner and outer diameter, the outer diameter of the elastic member is larger than an inner diameter of the holding section, the inner diameter of the elastic member is smaller than an outer diameter of a received ceramic bar, with the elastic member arranged between the holding section and the received ceramic bar in a compressed condition.

11. A device for purifying exhaust gas according to claim 4, wherein the ring-shaped holding member has a holding section and the holding section of the ring-shaped holding member is composed of a gutter-shaped member protruding toward inside of the ring-shaped holding member, and the gutter-shaped member includes a flange section at the end so as to prevent the ceramic bar from being disconnected.

12. A device for purifying exhaust gas according to claim 4, wherein the ring-shaped holding member has a holding section and the holding section of the ring-shaped holding member is composed of an engaging groove.

13. A device for purifying exhaust gas according to claim 4, wherein an engaging groove to hold the ceramic bar is formed in a recess arranged in the entire width of the ring-shaped holding member toward the inside thereof.

14. A device for purifying exhaust gas according to claim 1, where in an electrode section is arranged on an outer circumferential surface of the external metallic cylinder adjacent the upstream end face and an electricity introducing section to connect a central electrode by a lead wire is arranged in the external metallic cylinder adjacent the upstream end face, and a main catalyst support is arranged adjacent the downstream end face.

15. A device for purifying exhaust gas according to claim 14, wherein a clearance is located between the catalyst support downstream end face and an upstream end surface of a main catalyst support.

16. A device for purifying exhaust gas according to claim 4, wherein an edge of the ring-shaped holding member on the downstream side of exhaust gas is extended so as to form an external metallic cylinder of a main catalyst support disposed downstream of the honeycomb body.

17. A device for purifying exhaust gas according to claim 4, wherein at least one reinforcing layer is disposed on an outer circumference of the catalyst support and both end portions of the ceramic bars are held on the outer circumference reinforcing layer.

18. A device for purifying exhaust gas according to claim 1, wherein both end portions of each ceramic bar are held by the pin fixed to the outer circumferential portion of the catalyst support.

19. A device for purifying exhaust gas according to claim 1, wherein at least one reinforcing layer is formed on an outer circumference of the catalyst support, and both end portions of each ceramic bar are held by the pin fixed to the outer circumference reinforcing layer.

20. A device for purifying exhaust gas according to claim 1, wherein at least one reinforcing layer is formed on each of an outer and an inner circumference of the catalyst support, and each ceramic bar is arranged between the outer and the inner circumference reinforcing layers, and both end portions of each ceramic bar are held by the pin fixed to each reinforcing layer respectively.

21. A device for purifying exhaust gas according to claim 1, wherein recesses or through-holes are formed at both end portions of each ceramic bar on the downstream side of exhaust gas, and pins are inserted into the catalyst support through the recesses or through-holes so as to be fixed to the catalyst support, and a main catalyst support is provided downstream of the ceramic bars at a position so that an end surface of the main catalyst support faces a surface of the ceramic bar.

22. A device for purifying exhaust gas according to claim 1, further comprising a main catalyst support downstream of the ceramic bars and wherein recesses or through-holes are formed at both end portions of each ceramic bar on the upstream side of exhaust gas, and pins are inserted into the main catalyst support through the recesses or through-holes so as to be fixed to the main catalyst support.

23. A device for purifying exhaust gas according to claim 21, wherein the pin inserted into the recess or through-hole of the ceramic bar is formed into a U-shape.

24. A device for purifying exhaust gas according to claim 21, wherein the pin inserted into the recess or through-hole of the ceramic bar is formed to be linear.

25. A device for purifying exhaust gas according to claim 21, wherein an inner surface of the receiving external metallic cylinder of the catalyst support is arranged coming into contact with an external surface of an external metallic cylinder of the main catalyst support.

26. A device for purifying exhaust gas according to claim 21, wherein an outer surface of the external metallic cylinder of the catalyst support is arranged to come into contact with an internal surface of an external metallic cylinder of the main catalyst support.

27. A device for purifying exhaust gas according to claim 1, wherein the ceramic bar is made of a material, the principal component of which is silicon nitride or alumina.

28. A device for purifying exhaust gas according to claim 1, wherein a central electrode is arranged at a center of the catalyst support, and an end portion of the honeycomb body is joined to the central electrode.

29. A device for purifying exhaust gas according to claim 1, wherein a central electrode is arranged at a center of the catalyst support and the catalyst support formed by winding said flat metallic foil and said corrugated foil spirally with said flat metallic foil and said corrugated metal foil Joined at one end to said electrode.

* * * * *

UNITED STATES PATENT AND TRADEMARK OFFICE
CERTIFICATE OF CORRECTION

PATENT NO. : 5,902,557
DATED : May 11, 1999
INVENTOR(S) : Yotsuya et al

It is certified that error appears in the above-identified patent and that said Letters Patent is hereby corrected as shown below:

On the title page: Item [73]

Assignees: change "Kaisa" to --Kaisha--.

Signed and Sealed this

Twelfth Day of September, 2000

*Attest:*

Q. TODD DICKINSON

*Attesting Officer*  *Director of Patents and Trademarks*